(12) United States Patent  
Kembo et al.

(10) Patent No.: US 11,965,043 B2  
(45) Date of Patent: Apr. 23, 2024

(54) RESIN PARTICLE

(71) Applicant: FUJIFILM Business Innovation Corp., Tokyo (JP)

(72) Inventors: Ryutaro Kembo, Kanagawa (JP); Masaru Takahashi, Kanagawa (JP); Yukiaki Nakamura, Kanagawa (JP); Tomoaki Tanaka, Kanagawa (JP); Satomi Hara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 390 days.

(21) Appl. No.: 16/921,885

(22) Filed: Jul. 6, 2020

(65) Prior Publication Data

US 2021/0253750 A1 Aug. 19, 2021

(30) Foreign Application Priority Data

Feb. 17, 2020 (JP) ................................. 2020-024715

(51) Int. Cl.
| | | |
|---|---|---|
| C08G 65/34 | (2006.01) | |
| C08F 12/08 | (2006.01) | |
| C08G 63/672 | (2006.01) | |
| C08K 5/32 | (2006.01) | |
| C08K 5/3437 | (2006.01) | |

(52) U.S. Cl.
CPC ............ *C08F 12/08* (2013.01); *C08G 63/672* (2013.01); *C08G 65/34* (2013.01); *C08K 5/32* (2013.01); *C08K 5/3437* (2013.01)

(58) Field of Classification Search
CPC ....... C08F 12/08; C08G 63/672; C08G 65/34; C08K 5/32
See application file for complete search history.

(56) References Cited

U.S. PATENT DOCUMENTS

2009/0017307 A1* 1/2009 Kaul ..................... B32B 27/10  
428/413

FOREIGN PATENT DOCUMENTS

| JP | 2006267741 A | * 10/2006 | ............... G03G 9/08 |
| JP | 2012194521 A | * 10/2012 | ............... G02B 5/22 |
| JP | 2017-003818 | 1/2017 | |

OTHER PUBLICATIONS

JP2012194521A English Translation (Year: 2012).*  
JP2006267741A English Translation (Year: 2016).*  
JP2006267741A English translation (Year: 2006).*  
"Office Action of Japan Counterpart Application", dated Nov. 28, 2023, with English translation thereof, p. 1-p. 3.

* cited by examiner

*Primary Examiner* — Catherine S Branch  
*Assistant Examiner* — Huihong Qiao  
(74) *Attorney, Agent, or Firm* — JCIPRNET

(57) ABSTRACT

A resin particle includes a fluorescent colorant and a color pigment. A hue angle of the resin particle and a hue angle of the fluorescent colorant are different from each other. When a fluorescence peak wavelength in a spectral reflectance of the fluorescent colorant is represented by A (nm), an integrated value of a spectral reflectance (%) of the color pigment in a wavelength range of from A−30 (nm) to A+30 (nm) is 2,500 or more.

3 Claims, 2 Drawing Sheets

RESIN PARTICLE

CROSS-REFERENCE TO RELATED APPLICATIONS

This application is based on and claims priority under 35 USC 119 from Japanese Patent Application No. 2020-024715 filed Feb. 17, 2020.

BACKGROUND

(i) Technical Field

The present disclosure relates to a resin particle.

(ii) Related Art

Methods for visualizing image information through electrostatic images, such as an electrophotographic method, are currently used in various fields.

In an electrophotographic method that has been commonly used to date, image information is visualized through multiple steps of forming an electrostatic latent image on a photoreceptor or an electrostatic recording member by using various devices, causing charge-detecting particles referred to as a toner to adhere to the electrostatic latent image to develop the electrostatic latent image (toner image), transferring the developed image onto a surface of a transfer-receiving member, and fixing the image by, for example, heating.

A toner in the related art is described in, for example, Japanese Unexamined Patent Application Publication No. 2017-3818.

Japanese Unexamined Patent Application Publication No. 2017-3818 discloses a toner including a binder resin and a colorant, in which the colorant contains a color pigment and a fluorescent dye, when a content of the color pigment and a content of the fluorescent dye in the toner are represented by $W_G$ and $W_F$, respectively, on a mass basis, $W_G$ and $W_F$ satisfy a formula (1) below:

$$W_G \times 0.5 > W_F > W_G \times 0.025 \qquad (1), \text{and}$$

when an absorption peak wavelength of the color pigment is represented by $P_G$ and an emission peak wavelength of the fluorescent dye is represented by $P_F$, $P_G$ and $P_F$ satisfy a formula (2) below:

$$P_G < P_F \qquad (2).$$

SUMMARY

Aspects of non-limiting embodiments of the present disclosure relate to a resin particle including a fluorescent colorant and a color pigment, in which a hue angle of the resin particle and a hue angle of the fluorescent colorant are different from each other, and a fluorescence peak wavelength in a spectral reflectance of the fluorescent colorant is represented by A (nm). The resin particle provides an image having a high fluorescence intensity compared with a case where an integrated value of a spectral reflectance (%) of the color pigment in a wavelength range of from A−30 (nm) to A+30 (nm) is less than 2,500.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin particle including a fluorescent colorant and a color pigment, in which a hue angle of the resin particle and a hue angle of the fluorescent colorant are different from each other, and when a fluorescence peak wavelength in a spectral reflectance of the fluorescent colorant is represented by A (nm), an integrated value of a spectral reflectance (%) of the color pigment in a wavelength range of from A−30 (nm) to A+30 (nm) is 2,500 or more.

BRIEF DESCRIPTION OF THE DRAWINGS

An exemplary embodiment of the present disclosure will be described in detail based on the following figures, wherein.

DETAILED DESCRIPTION

Figure 1:
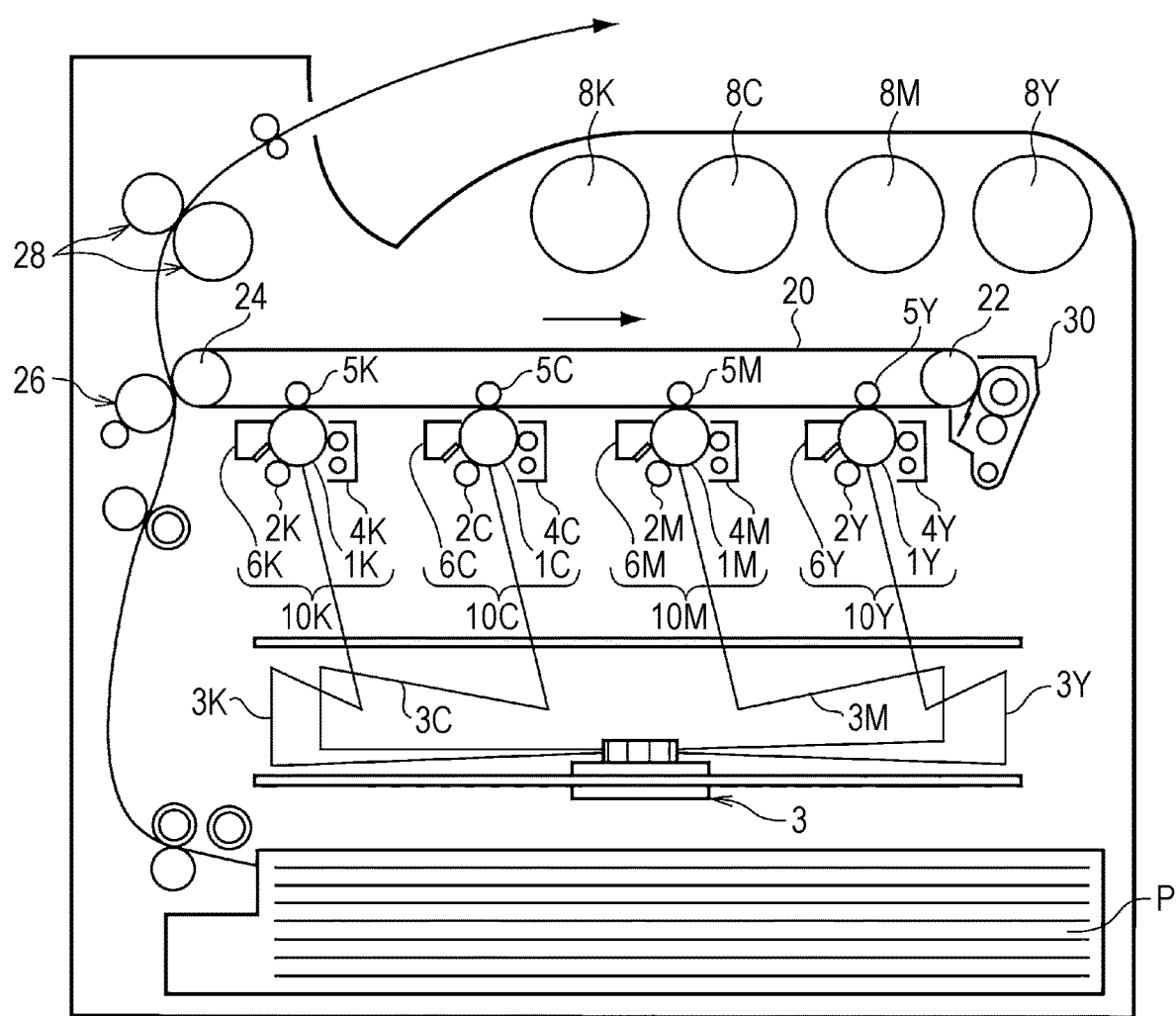
FIG. 1 is a schematic diagram of an image forming apparatus according to an exemplary embodiment.

In the present specification, if two or more substances corresponding to one component are present in a composition, the amount of the component in the composition refers to the total amount of the two or more substances present in the composition, unless otherwise stated.

In the present specification, a "toner for electrostatic image development" may be simply referred to as a "toner", and an "electrostatic image developer" may be simply referred to as a "developer".

An exemplary embodiment of the present disclosure will now be described.

Resin Particle

A resin particle according to the present exemplary embodiment includes a fluorescent colorant and a color pigment. A hue angle of the resin particle and a hue angle of the fluorescent colorant are different from each other. When a fluorescence peak wavelength in a spectral reflectance of the fluorescent colorant is represented by A (nm), an integrated value of a spectral reflectance (%) of the color pigment in a wavelength range of from A−30 (nm) to A+30 (nm) is 2,500 or more.

Recently, in digital printing, printers for use in, for example, commercial printing, publishing, and paper packaging fields, and printer models that appeal spot color toners have been introduced in the market from various manufacturers. Known fluorescent colors range from colors having a strong sense of fluorescence shown in Neons Guide available from PANTONE LLC to pale fluorescent colors shown in DIC Color Guide available from DIC Corporation and COLOR FINDER available from Toyo Ink Co., Ltd. However, when a fluorescent color is desired to be reproduced by using a toner whose hue is adjusted by incorporating a fluorescent colorant and a pigment, the fluorescence intensity may decrease in some cases.

Furthermore, as a result of detailed studies, the inventors of the present disclosure have found that in existing resin particles including a fluorescent colorant and a color pigment, absorption of the color pigment inhibits fluorescence by the fluorescent colorant, and the fluorescence intensity decreases.

Due to the configuration described above, the resin particle according to the present exemplary embodiment is capable of forming an image having a high fluorescence intensity. The reason for this is unclear but is presumably as follows.

The resin particle includes a fluorescent colorant and a color pigment, in which a hue angle of the resin particle and a hue angle of the fluorescent colorant are different from each other, and when a fluorescence peak wavelength in a spectral reflectance of the fluorescent colorant is represented by A (nm), an integrated value of a spectral reflectance (%) of the color pigment in a wavelength range of from A−30 (nm) to A+30 (nm) is 2,500 or more. With this configuration, fluorescence by the fluorescent colorant is not inhibited, the decrease in the fluorescence intensity by the color pigment is suppressed. Thus, there is provided a resin particle capable of forming an image having a high color reproducibility and a high fluorescence intensity. Furthermore, to suppress the decrease in the fluorescence intensity by the color pigment, it is effective to add a specific fluorescent colorant and a specific color pigment in combination in specific concentrations.

Resin particles according to the exemplary embodiment will be described in detail.

The hue angle of the resin particles is measured by the following method.

In an environmental room at a temperature of 25° C. and a humidity of 60% RH, a body, a developing device, and a toner cartridge of a DocuCentre Color 400 CP manufactured by Fuji Xerox Co., Ltd. are cleaned by sufficiently removing a developer and a toner that have been set therein, and resin particles are then placed in the toner cartridge.

Next, an amount of a developing toner of a monochromatic 100% image on OS coated paper manufactured by Fuji Xerox Co., Ltd. is adjusted to 4.5 g/m2, an image formed of only the resin particles and having a size of 5 cm×5 cm is prepared, and the image density (L*), redness (a*), and blueness (b*) are measured. The measurement of the image density is performed in the image plane 10 times at random by using an X-Rite 939 (manufactured by X-Rite Inc., aperture: 4 mm), and the results are averaged to calculate the image density.

The hue angle (=tan(b*/a*)) is calculated from a* and b* determined above.

The hue angle of the fluorescent colorant is calculated by the same method as the method for calculating the hue angle of the resin particles by using a sample provided by removing, from the resin particles, a colorant (such as the color pigment) other than the fluorescent colorant.

In the resin particles according to the exemplary embodiment, when a fluorescence peak wavelength in a spectral reflectance of the fluorescent colorant is represented by A (nm), an integrated value of a spectral reflectance (%) of the color pigment in a wavelength range of from A−30 (nm) to A+30 (nm) is 2,500 or more. From the viewpoint of fluorescence intensity and color reproducibility, the integrated value is preferably 2,800 or more, more preferably 2,900 or more, and particularly preferably 3,000 or more.

For example, when the fluorescence peak wavelength A is 600 nm, the wavelength range is 570 nm or more and 630 nm or less.

The unit of the integrated value is wavelength (nm)× spectral reflectance (%)=nm, but the unit is omitted in the following description.

The spectral reflectance of the resin particles is measured by the following method.

In an environmental room at a temperature of 25° C. and a humidity of 60% RH, a body, a developing device, and a toner cartridge of a DocuCentre Color 400 CP manufactured by Fuji Xerox Co., Ltd. are cleaned by sufficiently removing a developer and a toner that have been set therein, and resin particles are then placed in the toner cartridge.

Next, an amount of a developing toner of a monochromatic 100% image on OS coated paper manufactured by Fuji Xerox Co., Ltd. is adjusted to 4.5 g/m$^2$, and an image formed of only the resin particles and having a size of 5 cm×5 cm is prepared. The spectral reflectance in the visible light region is measured at 10 random points in the image plane by using an X-Rite 939 (manufactured by X-Rite Inc., aperture: 4 mm). The spectral reflectance is calculated by averaging the results.

The spectral reflectance of the fluorescent colorant is calculated by the same method as the method for calculating the spectral reflectance of the resin particles by using a sample provided by removing, from the resin particles, a colorant (such as the color pigment) other than the fluorescent colorant.

The spectral reflectance of the color pigment is calculated by the same method as the method for calculating the spectral reflectance of the resin particles by using a sample provided by removing, from the resin particles, a colorant (such as the fluorescent colorant) other than the color pigment.

The resin particles include a binder resin, a fluorescent colorant, a color pigment, and optionally a release agent and other additives. The resin particles may include a binder resin, a fluorescent colorant, a color pigment, and a release agent.

Fluorescent Colorant

The fluorescent colorant is a colorant that exhibits fluorescence and preferably a colorant that exhibits fluorescence in the visible light region (wavelength: 380 nm or more and 760 nm or less). The light that excites the fluorescent colorant is not particularly limited, but preferably includes at least visible light or ultraviolet light and more preferably includes at least visible light.

The fluorescent colorant may be a fluorescent pigment or a fluorescent dye. The fluorescent colorant is preferably a fluorescent dye.

In the exemplary embodiment, the term "pigment" refers to a colorant having a solubility in 100 g of water at 23° C. of less than 0.1 g and having a solubility in 100 g of cyclohexanone at 23° C. of less than 0.1 g, and the term "dye" refers to a colorant having a solubility in 100 g of water at 23° C. of 0.1 g or more and having a solubility in 100 g of cyclohexanone at 23° C. of 0.1 g or more.

The color of the fluorescent colorant is not particularly limited and may be appropriately selected according to the intended purpose.

Examples of the fluorescent colorant include a fluorescent pink colorant, a fluorescent red colorant, a fluorescent orange colorant, a fluorescent yellow colorant, and a fluorescent green colorant.

From the viewpoint of the sense of fluorescence by visual observation and target-color reproducibility, the fluorescent colorant preferably has a fluorescence peak wavelength in the spectral reflectance at 380 nm or more and 760 nm or less and preferably has a fluorescence peak wavelength in a region apart from the absorption wavelength of the target color.

For example, when a fluorescent pink is desired to be expressed, the fluorescent colorant more preferably has a fluorescence peak wavelength at 560 nm or more and 700 nm or less, and particularly preferably at 580 nm or more and 680 nm or less.

From the viewpoint of the sense of fluorescence by visual observation, the spectral reflectance of the fluorescent colorant is preferably 100% or more, more preferably 105% or more, and particularly preferably 110% or more at the fluorescence peak wavelength.

The fluorescent colorant used may be a publicly known fluorescent colorant. Specific examples thereof include Basic Red 1 (Rhodamine 6GCP), Basic Red 1:1 (Rhodamine 6GCP-N), Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, Basic Violet 27, Basic Violet 49, C.I. Pigment Yellow 101, Basic Yellow 1, Basic Yellow 2, Basic Yellow 9, Basic Yellow 24, Basic Yellow 40, Basic Orange 15, Basic Orange 22, Basic Blue 1, Basic Blue 3, Basic Blue 7, Basic Blue 9, Basic Blue 45, Basic Green 1, Acid Yellow 3, Acid Yellow 7, Acid Yellow 73, Acid Yellow 87, Acid Yellow 184, Acid Yellow 245, Acid Yellow 250, Acid Red 51, Acid Red 52, Acid Red 57, Acid Red 77, Acid Red 87, Acid Red 89, Acid Red 92, Acid Blue 9, Acid Black 2, Solvent Yellow 43, Solvent Yellow 44, Solvent Yellow 85, Solvent Yellow 98, Solvent Yellow 116, Solvent Yellow 131, Solvent Yellow 145, Solvent Yellow 160:1, Solvent Yellow 172, Solvent Yellow 185, Solvent Yellow 195, Solvent Yellow 196, Solvent Orange 63, Solvent Orange 112, Solvent Red 49, Solvent Red 149, Solvent Red 175, Solvent Red 196, Solvent Red 197, Solvent Blue 5, Solvent Green 5, Solvent Green 7, Direct Yellow 27, Direct Yellow 85, Direct Yellow 96, Direct Orange 8, Direct Red 2, Direct Red 9, Direct Blue 22, Direct Blue 199, Direct Green 6, Disperse Yellow 11, Disperse Yellow 82, Disperse Yellow 139, Disperse Yellow 184, Disperse Yellow 186, Disperse Yellow 199, Disperse Yellow 202, Disperse Yellow 232, Disperse Orange 11, Disperse Orange 32, Disperse Red 58, Disperse Red 274, Disperse Red 277, Disperse Red 303, Disperse Blue 7, Reactive Yellow 78, and Vat Red 41.

From the viewpoint of fluorescence intensity, of the above fluorescent colorants, preferred is at least one fluorescent colorant selected from the group consisting of Basic Red 1 (Rhodamine 6GCP), Basic Red 1:1 (Rhodamine 6GCP-N), Basic Red 2, Basic Red 12, Basic Red 13, Basic Red 14, Basic Red 15, Basic Red 36, Basic Violet 7, Basic Violet 10 (Rhodamine B), Basic Violet 11 (Rhodamine 3B), Basic Violet 11:1 (Rhodamine A), Basic Violet 15, Basic Violet 16, Basic Violet 27, Basic Yellow 24, Basic Yellow 40, Basic Orange 15, Basic Orange 22, and Basic Green 1.

From the viewpoint of fluorescence intensity and target-color reproducibility, the fluorescent colorant preferably includes a compound having a xanthene structure, a compound having a heterocyclic structure formed of a benzimidazole skeleton and a coumarin skeleton, or a compound having a triarylmethane structure, an acridine structure, or a methine structure and more preferably includes a compound having a xanthene structure.

The compound having a xanthene structure is preferably a compound having a rhodamine structure, a fluorescein structure, or an eosin structure and particularly preferably a compound having a rhodamine structure.

The resin particles may include one fluorescent colorant alone or two or more fluorescent colorants in combination.

From the viewpoint of fluorescence intensity, the content of the fluorescent colorant is preferably 0.01% by mass or more and 20% by mass or less, more preferably 0.1% by mass or more and 3.5% by mass or less, and particularly preferably 0.2% by mass or more and 2.0% by mass or less based on the total mass of the resin particles.

Color Pigment

The color pigment is a color pigment other than the fluorescent colorant, and a publicly known color pigment may be used.

The color pigment may be a color pigment that does not exhibit fluorescence in the visible light region.

Specific examples of the color pigment include various pigments such as C.I. Pigment Red 1, 2, 3, 4, 5, 6, 7, 8, 9, 10, 11, 12, 14, 15, 16, 17, 18, 21, 22, 23, 31, 32, 38, 41, 48, 48:1, 48:2, 48:3, 48:4, 49, 52, 53:1, 54, 57:1, 58, 60:1, 63, 64:1, 68, 81:1, 81:4, 83, 88, 89, 112, 114, 122, 123, 144, 146, 149, 150, 166, 170, 176, 177, 178, 179, 184, 185, 187, 202, 206, 207, 208, 209, 210, 213, 220, 221, 238, 242, 245, 253, 254, 255, 256, 258, 264, 266, 269, and 282; C.I. Pigment Violet 19, 23, and 32; C.I. Pigment Blue 15:6 and 60; C.I. Pigment Orange 13, 16, 38, 43, and 62; C.I. Pigment Yellow 3, 12, 17, 74, 139, 150, 155, 180, and 185; C.I. Pigment Green 7 and 36; red iron oxide, cadmium red, red lead, mercury sulfide, Permanent Red 4R, Lithol Red, Pyrazolone Red, Watching Red, a calcium salt, titanium oxide, Lake Red D, Brilliant Carmine 6B, Eosin Lake, Rhodamine Lake B, Alizarin Lake, Brilliant Carmine 3B, carbon black, Chromium Yellow, Hansa Yellow, Benzidine Yellow, Threne Yellow, Quinoline Yellow, Pigment Yellow, Permanent Orange GTR, Pyrazolone Orange, Vulcan Orange, Brilliant Carmine 3B, Brilliant Carmine 6B, DuPont Oil Red, Lake Red C, Aniline Blue, Ultramarine Blue, Calco Oil Blue, Methylene Blue Chloride, Phthalocyanine Blue, Pigment Blue, Phthalocyanine Green, and Malachite Green Oxalate.

The resin particles may include one color pigment alone or two or more color pigments in combination.

From the viewpoint of fluorescence intensity and target-color reproducibility, a color pigment having no absorption wavelength near the fluorescence peak wavelength of the fluorescent colorant may be used.

The color pigment used may be optionally subjected to a surface treatment. The color pigment may be used in combination with a dispersant. Furthermore, two or more colorants may be used in combination.

From the viewpoint of fluorescence intensity and target-color reproducibility, the content of the color pigment is preferably 0.005% by mass or more and 10% by mass or less, more preferably 0.05% by mass or more and 1.5% by mass or less, and particularly preferably 0.05% by mass or more and 1.2% by mass or less based on the total mass of the resin particles.

From the viewpoint of fluorescence intensity and target-color reproducibility, a ratio (WB/WA) of the color pigment content WB to the fluorescent colorant content WA in the resin particles is preferably 0.001 or more and 10 or less, more preferably 0.005 or more and 5 or less, and particularly preferably 0.01 or more and 1.5 or less.

In the Case of Fluorescent Pink Resin Particles

In the case where the resin particles according to the exemplary embodiment are fluorescent pink resin particles, from the viewpoint of fluorescence intensity and target-color reproducibility, the fluorescent colorant in the resin particles according to the exemplary embodiment preferably has a fluorescence peak wavelength in the spectral reflectance at 560 nm or more and 700 nm or less and more preferably 580 nm or more and 680 nm or less.

In the case where the resin particles according to the exemplary embodiment are fluorescent pink resin particles, from the viewpoint of fluorescence intensity and target-color reproducibility, the color pigment in the resin particles according to the exemplary embodiment preferably includes at least one magenta pigment, and the color pigment is preferably at least one magenta pigment that exhibits low absorption in the wavelength range of from A−30 (nm) to A+30 (nm) where A represents the fluorescence peak wavelength of the fluorescent colorant.

In particular, from the viewpoint of fluorescence intensity and target-color reproducibility, in the resin particles according to the exemplary embodiment, the fluorescent colorant is more preferably a compound having a xanthene structure, and the color pigment is more preferably a compound having a quinacridone structure.

From the viewpoint of fluorescence intensity and target-color reproducibility, the compound having a xanthene structure is preferably a compound having a rhodamine structure, a fluorescein structure, or an eosin structure and more preferably a compound having a rhodamine structure.

Examples of the compound having a xanthene structure include Basic Red 1 (Rhodamine 6GCP), Basic Red 1:1 (Rhodamine 6GCP-N), Basic Violet 10 (Rhodamine B), Basic Violet 11 (Rhodamine 3B), Basic Violet 11:1 (Rhodamine A), Acid Red 51, Acid Red 52, Acid Red 87, Acid Red 92, and Solvent Red 49.

From the viewpoint of fluorescence intensity and target-color reproducibility, the compound having a quinacridone structure is preferably at least one compound selected from the group consisting of C.I. Pigment Red 122, C.I. Pigment Red 202, C.I. Pigment Red 207, C.I. Pigment Red 209, C.I. Pigment Red 238, and C.I. Pigment Violet 19, more preferably at least one compound selected from the group consisting of C.I. Pigment Red 122, C.I. Pigment Red 238, and C.I. Pigment Violet 19, and more preferably at least two compounds selected from the group consisting of C.I. Pigment Red 122, C.I. Pigment Red 238, and C.I. Pigment Violet 19.

In the case where the resin particles according to the exemplary embodiment are fluorescent pink resin particles, from the viewpoint of target-color reproducibility, preferably, the color difference ΔE between the resin particles and the color sample DIC584B is 10 or less, the color difference ΔE between the resin particles and the color sample DIC584 is 10 or less, or the color difference ΔE between the resin particles and the color sample PANTONE806C is 10 or less; more preferably, the color difference ΔE between the resin particles and the color sample DIC584B is 10 or less or the color difference ΔE between the resin particles and the color sample DIC584 is 10 or less; and particularly preferably, the color difference ΔE between the resin particles and the color sample DIC584B is 10 or less. The ΔE is preferably 5 or less. The lower limit of the ΔE is 0.

The color sample DIC584B and the like are color samples in the above-mentioned DIC Color Guide available from DIC Corporation, and the color sample PANTONE806C and the like are color samples in the above-mentioned Neons Guide available from PANTONE LLC.

The color difference ΔE is measured by the following method.

In an environmental room at a temperature of 25° C. and a humidity of 60% RH, a body, a developing device, and a toner cartridge of a DocuCentre Color 400 CP manufactured by Fuji Xerox Co., Ltd. are cleaned by sufficiently removing a developer and a toner that have been set therein, and resin particles are then placed in the toner cartridge.

Next, an amount of a developing toner of a monochromatic 100% image on OS coated paper manufactured by Fuji Xerox Co., Ltd. is adjusted to 4.5 g/m2, an image formed of only the resin particles and having a size of 5 cm×5 cm is prepared, and the image density ($L^*_a$), redness ($a^*_a$), and blueness ($b^*_a$) are measured. The measurement of the image density is performed in the image plane 10 times at random by using an X-Rite 939 (manufactured by X-Rite Inc., aperture: 4 mm), and the results are averaged to calculate the image density.

In addition, $L^*_b$, $a^*_b$, and $b^*_b$ of a target color sample are calculated by a method similar to the measuring method for the image.

The color difference $\Delta E = \sqrt{\{(L^*_b - L^*_a)^2 + (a^*_b - a^*_a)^2 + (b^*_b - b^*_a)^2\}}$) is calculated from the L*, a*, and b* of the resin particles and the color sample.

In the case where the resin particles according to the exemplary embodiment are fluorescent pink resin particles, from the viewpoint of fluorescence intensity and target-color reproducibility, preferably, the content of the fluorescent colorant is 0.01% by mass or more and 20% by mass or less based on the total mass of the resin particles, and the content of the color pigment is 0.005% by mass or more and 10% by mass or less based on the total mass of the resin particles; more preferably, the content of the fluorescent colorant is 0.1% by mass or more and 3.5% by mass or less based on the total mass of the resin particles, and the content of the color pigment is 0.05% by mass or more and 1.5% by mass or less based on the total mass of the resin particles; and particularly preferably, the content of the fluorescent colorant is 0.2% by mass or more and 2.0% by mass or less based on the total mass of the resin particles, and the content of the color pigment is 0.05% by mass or more and 1.2% by mass or less based on the total mass of the resin particles.

In the Case of Fluorescent Yellow Resin Particles

In the case where the resin particles according to the exemplary embodiment are fluorescent yellow resin particles, examples of the fluorescent colorant include C.I. Pigment Yellow 101, Basic Yellow 1, Basic Yellow 2, Basic Yellow 9, Basic Yellow 24, Basic Yellow 40, Solvent Yellow 43, Solvent Yellow 44, Solvent Yellow 85, Solvent Yellow 98, Solvent Yellow 116, Solvent Yellow 131, Solvent Yellow 145, Solvent Yellow 160:1, Solvent Yellow 172, Solvent Yellow 185, Solvent Yellow 195, Solvent Yellow 196, Direct Yellow 27, Direct Yellow 85, Direct Yellow 96, Disperse Yellow 11, Disperse Yellow 82, Disperse Yellow 139, Disperse Yellow 184, Disperse Yellow 186, Disperse Yellow 199, Disperse Yellow 202, Disperse Yellow 232, and Reactive Yellow 78.

In the case where the resin particles according to the exemplary embodiment are fluorescent yellow resin particles, from the viewpoint of fluorescence intensity and target-color reproducibility, the color pigment in the resin particles according to the exemplary embodiment is preferably a yellow pigment.

In particular, from the viewpoint of fluorescence intensity and target-color reproducibility, in the resin particles according to the exemplary embodiment, the fluorescent colorant is more preferably a compound having a heterocyclic structure formed of a benzimidazole skeleton and a coumarin skeleton, and the color pigment is more preferably a compound having an azo structure or a compound having a benzimidazolone structure.

An example of the compound having a heterocyclic structure formed of a benzimidazole skeleton and a coumarin skeleton is C.I. Basic Yellow 40.

Examples of the compound having an azo structure include monoazo pigments such as C.I. Pigment Yellow 74, and C.I. Pigment Yellow 1, 2, 3, 5, 6, 49, 65, 73, 75, 97, 98, 111, 116, and 130; condensed disazo pigments such as C.I. Pigment Yellow 93, and C.I. Pigment Yellow 94, 95, 128, and 166; and disazo pigments such as C.I. Pigment Yellow 12, 13, 14, 17, 55, 63, 81, 83, 87, 90, 106, 113, 114, 121, 124, 126, 127, 136, 152, 170, 171, 172, 174, 176, and 188.

An example of the compound having a benzimidazolone structure is C.I. Pigment Yellow 180.

In the case where the resin particles according to the exemplary embodiment are fluorescent yellow resin particles, from the viewpoint of hue and color reproducibility, preferably, the color difference ΔE between the resin particles and the color sample DIC589 is 10 or less, the color difference ΔE between the resin particles and the color sample DIC590 is 10 or less, or the color difference ΔE between the resin particles and the color sample PANTONE803C is 10 or less; more preferably, the color difference ΔE between the resin particles and the color sample DIC589 is 10 or less or the color difference ΔE between the resin particles and the color sample DIC590 is 10 or less; and particularly preferably, the color difference ΔE between the resin particles and the color sample DIC590 is 10 or less. The ΔE is preferably 5 or less.

In the case where the resin particles according to the exemplary embodiment are fluorescent yellow resin particles, from the viewpoint of fluorescence intensity and target-color reproducibility, preferably, the content of the fluorescent colorant is 0.01% by mass or more and 20%, by mass or less based on the total mass of the resin particles, and the content of the color pigment is 0.005% by mass or more and 10% by mass or less based on the total mass of the resin particles; more preferably, the content of the fluorescent colorant is 0.1% by mass or more and 3.5% by mass or less based on the total mass of the resin particles, and the content of the color pigment is 0.05% by mass or more and 1.5% by mass or less based on the total mass of the resin particles; and particularly preferably, the content of the fluorescent colorant is 0.2% by mass or more and 2.0% by mass or less based on the total mass of the resin particles, and the content of the color pigment is 0.05% by mass or more and 1.2% by mass or less based on the total mass of the resin particles.

In the Case of Fluorescent Green Resin Particles

In the case where the resin particles according to the exemplary embodiment are fluorescent green resin particles, from the viewpoint of fluorescence intensity and target-color reproducibility, the color pigment in the resin particles according to the exemplary embodiment is preferably at least one color pigment selected from the group consisting of green pigments, cyan pigments, and yellow pigments.

In particular, from the viewpoint of fluorescence intensity and target-color reproducibility, in the resin particles according to the exemplary embodiment, the fluorescent colorant is more preferably a compound having a triarylmethane structure, and the color pigment is more preferably a compound having a phthalocyanine structure.

Examples of the compound having a triarylmethane structure include Basic Blue 1, Basic Blue 7, and Basic Green 1.

Examples of the compound having a phthalocyanine structure include C.I. Pigment Green 7, C.I. Pigment Green 36, C.I. Pigment Blue 15:1, and C.I. Pigment Blue 15:3.

In the case where the resin particles according to the exemplary embodiment are fluorescent green resin particles, from the viewpoint of target-color reproducibility, preferably, the color difference ΔE between the resin particles and the color sample DIC591 is 10 or less or the color difference ΔE between the resin particles and the color sample PANTONE802C is 10 or less. The ΔE is preferably 5 or less.

In the case where the resin particles according to the exemplary embodiment are fluorescent green resin particles, from the viewpoint of fluorescence intensity and target-color reproducibility, preferably, the content of the fluorescent colorant is 0.01% by mass or more and 20% by mass or less based on the total mass of the resin particles, and the content of the color pigment is 0.005% by mass or more and 10% by mass or less based on the total mass of the resin particles; more preferably, the content of the fluorescent colorant is 0.1% by mass or more and 3.5% by mass or less based on the total mass of the resin particles, and the content of the color pigment is 0.05% by mass or more and 1.5% by mass or less based on the total mass of the resin particles; and particularly preferably, the content of the fluorescent colorant is 0.2% by mass or more and 2.0% by mass or less based on the total mass of the resin particles, and the content of the color pigment is 0.05% by mass or more and 1.2% by mass or less based on the total mass of the resin particles.

In the Case of Fluorescent Red Resin Particles

In the case where the resin particles according to the exemplary embodiment are fluorescent red resin particles, from the viewpoint of fluorescence intensity and target-color reproducibility, the color pigment in the resin particles according to the exemplary embodiment is preferably at least one color pigment selected from the group consisting of magenta pigments and red pigments, and more preferably a red pigment.

In particular, from the viewpoint of fluorescence intensity and target-color reproducibility, in the resin particles according to the exemplary embodiment, the fluorescent colorant is preferably a compound having a xanthene structure, and the color pigment is preferably a compound having a quinacridone structure, a naphthamide structure, or a diketopyrrolopyrrole structure and more preferably a compound having a quinacridone structure or a naphthamide structure.

From the viewpoint of fluorescence intensity and target-color reproducibility, the compound having a xanthene structure is preferably a compound having a rhodamine structure, a fluorescein structure, or an eosin structure and more preferably a compound having a rhodamine structure.

From the viewpoint of fluorescence intensity and target-color reproducibility, the compound having a quinacridone structure is preferably at least one compound selected from the group consisting of C.I. Pigment Red 122, C.I. Pigment Red 202, C.I. Pigment Red 207, C.I. Pigment Red 209, C.I. Pigment Red 238, and C.I. Pigment Violet 19 and more preferably at least one compound selected from the group consisting of C.I. Pigment Red 122, C.I. Pigment Red 238, and C.I. Pigment Violet 19.

Examples of the compound having a naphthamide structure include C.I. Pigment Red 112, C.I. Pigment Red 150, C.I. Pigment Red 160, C.I. Pigment Red 170, C.I. Pigment Red 171, C.I. Pigment Red 188, and C.I. Pigment Red 213.

Examples of the compound having a diketopyrrolopyrrole structure include C.I. Pigment Red 254, C.I. Pigment Red 255, and C.I. Pigment Red 264.

In the case where the resin particles according to the exemplary embodiment are fluorescent red resin particles, from the viewpoint of hue and color reproducibility, preferably, the color difference ΔE between the resin particles and the color sample DIC585 is 10 or less, the color difference ΔE between the resin particles and the color sample DIC586 is 10 or less, or the color difference ΔE between the resin particles and the color sample PANTONE805C is 10 or less. The ΔE is preferably 5 or less.

In the case where the resin particles according to the exemplary embodiment are fluorescent red resin particles, from the viewpoint of fluorescence intensity and target-color reproducibility, preferably, the content of the fluorescent colorant is 0.01% by mass or more and 20% by mass or less based on the total mass of the resin particles, and the content of the color pigment is 0.005% by mass or more and 10% by mass or less based on the total mass of the resin particles; more preferably, the content of the fluorescent colorant is 0.1% by mass or more and 3.5% by mass or less based on the total mass of the resin particles, and the content of the color pigment is 0.05% by mass or more and 1.5% by mass or less based on the total mass of the resin particles; and particularly preferably, the content of the fluorescent colorant is 0.2% by mass or more and 2.0% by mass or less based on the total mass of the resin particles, and the content of the color pigment is 0.05% by mass or more and 1.2% by mass or less based on the total mass of the resin particles.

In the Case of Fluorescent Orange Resin Particles

In the case where the resin particles according to the exemplary embodiment are fluorescent orange resin particles, from the viewpoint of fluorescence intensity and color reproducibility, the color pigment in the resin particles according to the exemplary embodiment is preferably at least one color pigment selected from the group consisting of orange pigments, magenta pigments, and yellow pigments, and more preferably an orange pigment.

In particular, from the viewpoint of fluorescence intensity and color reproducibility, in the resin particles according to the exemplary embodiment, the fluorescent colorant is preferably a compound having a heterocyclic structure formed of a benzimidazole skeleton and a coumarin skeleton, a compound having an acridine structure, or a compound having a methine structure, and the color pigment is preferably a compound having an azo structure, a compound having a naphthamide structure, or a compound having an anthraquinone structure.

An example of the compound having an acridine structure is C.I. Basic Orange 15.

An example of the compound having a methine structure is C.I. Basic Orange 22.

Examples of the compound having an anthraquinone structure include Solvent Orange 63 and Disperse Orange 11.

Examples of the compound having a naphthamide structure include C.I. Pigment Orange 24 and C.I. Pigment Orange 38.

In the case where the resin particles according to the exemplary embodiment are fluorescent orange resin particles, from the viewpoint of hue and color reproducibility, preferably, the color difference ΔE between the resin particles and the color sample DIC587 is 10 or less, the color difference ΔE between the resin particles and the color sample DIC588 is 10 or less, or the color difference ΔE between the resin particles and the color sample PANTONE804C is 10 or less; and more preferably, the color difference ΔE between the resin particles and the color sample DIC587 is 10 or less or the color difference ΔE between the resin particles and the color sample DIC588 is 10 or less. The ΔE is preferably 5 or less.

In the case where the resin particles according to the exemplary embodiment are fluorescent orange resin particles, from the viewpoint of fluorescence intensity and target-color reproducibility, preferably, the content of the fluorescent colorant is 0.01% by mass or more and 20% by mass or less based on the total mass of the resin particles, and the content of the color pigment is 0.005% by mass or more and 10% by mass or less based on the total mass of the resin particles; more preferably, the content of the fluorescent colorant is 0.1% by mass or more and 3.5% by mass or less based on the total mass of the resin particles, and the content of the color pigment is 0.05% by mass or more and 1.5% by mass or less based on the total mass of the resin particles; and particularly preferably, the content of the fluorescent colorant is 0.2% by mass or more and 2.0% by mass or less based on the total mass of the resin particles, and the content of the color pigment is 0.05% by mass or more and 1.2% by mass or less based on the total mass of the resin particles.

In the Case of Fluorescent Purple Resin Particles

In the case where the resin particles according to the exemplary embodiment are fluorescent purple (violet) resin particles, from the viewpoint of fluorescence intensity and hue, the color pigment in the resin particles according to the exemplary embodiment is preferably at least one color pigment selected from the group consisting of purple pigments (violets pigments), magenta pigments, and cyan pigments and more preferably at least one color pigment selected from the group consisting of purple pigments and magenta pigments.

In particular, from the viewpoint of fluorescence intensity and hue, in the resin particles according to the exemplary embodiment, the fluorescent colorant is preferably a compound having a xanthene structure or a methine structure, and the color pigment is preferably a compound having any of a quinacridone structure, a naphthamide structure, a dioxazine structure, a benzimidazolone structure, an anthraquinone structure, and a phthalocyanine structure; and the fluorescent colorant is more preferably a compound having a xanthene structure and the color pigment is more preferably a compound having a quinacridone structure.

From the viewpoint of fluorescence intensity and hue, the compound having a xanthene structure is preferably a compound having a rhodamine structure, a fluorescein structure, or an eosin structure and more preferably a compound having a rhodamine structure.

Examples of the compound having a xanthene structure include Basic Violet 10 (Rhodamine B), Basic Violet 11 (Rhodamine 3B), and Basic Violet 11:1 (Rhodamine A).

From the viewpoint of fluorescence intensity and target-color reproducibility, the compound having a quinacridone structure is preferably at least one compound selected from the group consisting of C.I. Violet 19 and C.I. Pigment Violet 42.

From the viewpoint of fluorescence intensity and target-color reproducibility, the compound having a naphthamide structure is preferably at least one compound selected from the group consisting of C.I. Violet 13, C.I. Violet 17, C.I. Violet 25, and C.I. Pigment Violet 50.

Examples of the compound having a phthalocyanine structure include C.I. Pigment Blue 15, C.I. Pigment Blue 15:1, C.I. Pigment Blue 15:3, C.I. Pigment Blue 15:4, C.I. Pigment Blue 15:6, and C.I. Pigment Blue 16.

Examples of other purple pigments include C.I. Pigment Violet 23 and C.I. Pigment Violet 37.

In the case where the resin particles according to the exemplary embodiment are fluorescent purple resin particles, from the viewpoint of hue and color reproducibility, the color difference ΔE between the resin particles and the color sample PANTONE807C is preferably 10 or less, and more preferably 5 or less.

In the case where the resin particles according to the exemplary embodiment are fluorescent purple resin particles, from the viewpoint of fluorescence intensity and target-color reproducibility, preferably, the content of the fluorescent colorant is 0.01% by mass or more and 20% by mass or less based on the total mass of the resin particles, and the content of the color pigment is 0.005% by mass or more and 10% by mass or less based on the total mass of the resin particles; more preferably, the content of the fluorescent colorant is 0.1% by mass or more and 3.5% by mass or less based on the total mass of the resin particles, and the content of the color pigment is 0.05% by mass or more and 1.5% by mass or less based on the total mass of the resin particles; and particularly preferably, the content of the fluorescent colorant is 0.2% by mass or more and 2.0% by mass or less based on the total mass of the resin particles, and the content of the color pigment is 0.05% by mass or more and 1.2% by mass or less based on the total mass of the resin particles.

In the Case of Fluorescent Sky Blue Resin Particles

In the case where the resin particles according to the exemplary embodiment are fluorescent sky blue (light blue) resin particles, from the viewpoint of fluorescence intensity and hue, the color pigment in the resin particles according to the exemplary embodiment is preferably at least one color pigment selected from the group consisting of cyan pigments, blue pigments, and white pigments.

In particular, from the viewpoint of fluorescence intensity and hue, in the resin particles according to the exemplary embodiment, the fluorescent colorant is preferably a compound having a triarylmethane structure, and the color pigment is preferably a compound having a phthalocyanine structure or titanium oxide.

Examples of the compound having a triarylmethane structure include Basic Blue 1, Basic Blue 7, Acid Blue 9, and Solvent Blue 5.

Examples of the compound having a phthalocyanine structure include C.I. Pigment Blue 15, C.I. Pigment Blue 15:1, C.I. Pigment Blue 15:3, C.I. Pigment Blue 15:4, C.I. Pigment Blue 15:6, and C.I. Pigment Blue 16.

In the case where the resin particles according to the exemplary embodiment are fluorescent sky blue resin particles, from the viewpoint of hue and color reproducibility, the color difference ΔE between the resin particles and the color sample PANTONE801C is preferably 10 or less, and more preferably 5 or less.

In the case where the resin particles according to the exemplary embodiment are fluorescent sky blue resin particles, from the viewpoint of fluorescence intensity and target-color reproducibility, preferably, the content of the fluorescent colorant is 0.01% by mass or more and 20% by mass or less based on the total mass of the resin particles, and the content of the color pigment is 0.005% by mass or more and 10% by mass or less based on the total mass of the resin particles; more preferably, the content of the fluorescent colorant is 0.1% by mass or more and 3.5% by mass or less based on the total mass of the resin particles, and the content of the color pigment is 0.05% by mass or more and 1.5% by mass or less based on the total mass of the resin particles; and particularly preferably, the content of the fluorescent colorant is 0.2% by mass or more and 2.0% by mass or less based on the total mass of the resin particles, and the content of the color pigment is 0.05% by mass or more and 1.2% by mass or less based on the total mass of the resin particles.

Binder Resin

Examples of the binder resin include vinyl resins made of homopolymers of monomers such as styrenes (for example, styrene, p-chlorostyrene, and α-methylstyrene), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacrylonitrile), vinyl ethers (for example, vinyl methyl ether and vinyl isobutyl ether), vinyl ketones (for example, vinyl methyl ketone, vinyl ethyl ketone, and vinyl isopropenyl ketone), and olefins (for example, ethylene, propylene, and butadiene); and vinyl resins made of copolymers of combinations of two or more of the above monomers.

Examples of the binder resin further include non-vinyl resins such as epoxy resins, polyester resins, polyurethane resins, polyamide resins, cellulose resins, polyether resins, and modified rosins; mixtures of these non-vinyl resins and the above vinyl resins; and graft polymers obtained by polymerizing a vinyl monomer in the presence of any of these resins.

Of these, styrene-acrylic copolymers or polyester resins are suitably used, and polyester resins are more suitably used.

These binder resins may be used alone or in combination of two or more thereof.

The binder resin may be an amorphous (also referred to as "non-crystalline") resin or a crystalline resin.

From the viewpoint of properties of suppressing density unevenness in an image to be obtained, the binder resin preferably includes a crystalline resin and more preferably includes an amorphous resin and a crystalline resin.

The content of the crystalline resin is preferably 2% by mass or more and 40% by mass or less, more preferably 2% by mass or more and 20% by mass or less, and particularly preferably 3% by mass or more and 15% by mass or less based on the total mass of the binder resin.

The "crystallinity" of a resin refers to, in differential scanning calorimetry (DSC), having a clear endothermic peak instead of a stepwise change in an amount of heat absorption, and specifically means that a half width of an endothermic peak is within 10° C. when measuring is performed at a temperature-increasing rate of 10 (° C./min).

On the other hand, the "amorphousness" of a resin means that the half width exceeds 10° C., that a stepwise change in an amount of heat absorption is exhibited, or that no clear endothermic peak is observed.

Polyester Resin

Examples of the polyester resin include publicly known polyester resins.

Amorphous Polyester Resin

The amorphous polyester resin is, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl esters (having, for example, 1 to 5 carbon atoms) thereof. In particular, the polycarboxylic acid is preferably, for example, an aromatic dicarboxylic acid.

A trivalent or higher carboxylic acid having a crosslinked or branched structure may be used as the polycarboxylic acid in combination with a dicarboxylic acid. Examples of the trivalent or higher carboxylic acid include trimellitic acid, pyromellitic acid, anhydrides thereof, and lower alkyl esters (having, for example, 1 to 5 carbon atoms) thereof.

These polycarboxylic acids may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

A trivalent or higher polyhydric alcohol having a crosslinked or branched structure may be used, as the polyhydric alcohol, in combination with a diol. Examples of the trivalent or higher polyhydric alcohol include glycerin, trimethylolpropane, and pentaerythritol.

These polyhydric alcohols may be used alone or in combination or two or more thereof.

The glass transition temperature (Tg) of the amorphous polyester resin is preferably 50° C. or higher and 80° C. or lower, and more preferably 50° C. or higher and 65° C. or lower.

The glass transition temperature is determined from a differential scanning calorimetry (DSC) curve obtained by DSC. More specifically, the glass transition temperature is determined from the "extrapolated glass transition onset temperature" described in glass transition temperature determination methods in "Testing methods for transition temperatures of plastics" in JIS K 7121-1987.

The weight-average molecular weight (Mw) of the amorphous polyester resin is preferably 5,000 or more and 1,000,000 or less, and more preferably 7,000 or more and 500,000 or less.

The number-average molecular weight (Mn) of the amorphous polyester resin is preferably 2,000 or more and 100,000 or less.

The molecular weight distribution Mw/Mn of the amorphous polyester resin is preferably 1.5 or more and 100 or less, and more preferably 2 or more and 60 or less.

The weight-average molecular weight and the number-average molecular weight are measured by gel permeation chromatography (GPC). The molecular weight measurement by GPC is performed by using a GPC measurement apparatus HLC-8120GPC manufactured by TOSOH Corporation and using a TSKgel SuperHM-M (15 cm) column manufactured by TOSOH Corporation and a tetrahydrofuran (THF) solvent. The weight-average molecular weight and the number-average molecular weight are calculated from the measurement results by using a molecular-weight calibration curve prepared with monodispersed polystyrene standard samples.

The amorphous polyester resin is obtained by a well-known production method. Specifically, the amorphous polyester resin is obtained by, for example, a method including setting a polymerization temperature to 180° C. or higher and 230° C. or lower, reducing the pressure inside the reaction system, as necessary, and allowing the reaction to proceed while water and alcohol generated during condensation are removed.

If raw material monomers do not dissolve or are not compatible with each other at the reaction temperature, a solvent having a high boiling point may be added as a solubilizer to dissolve the monomers. In such a case, the polycondensation reaction is performed while the solubilizer is distilled off. When a monomer with poor compatibility is present, the monomer with poor compatibility and an acid or alcohol to be polycondensed with the monomer may be condensed in advance and the resulting condensed product and the remaining components may then be subjected to polycondensation.

Crystalline Polyester Resin

The crystalline polyester resin is, for example, a polycondensation product of a polycarboxylic acid and a polyhydric alcohol. The crystalline polyester resin used may be a commercial product or a synthesized product.

In order to easily form a crystalline structure, the crystalline polyester resin is preferably a polycondensation product obtained by using polymerizable monomers having a linear aliphatic structure rather than polymerizable monomers having an aromatic structure.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids, e.g., phthalic acid, isophthalic acid, terephthalic acid, and naphthalene-2,6-dicarboxylic acid), anhydrides thereof, and lower alkyl esters (having, for example, 1 to 5 carbon atoms) thereof.

A trivalent or higher carboxylic acid having a crosslinked or branched structure may be used as the polycarboxylic acid in combination with a dicarboxylic acid. Examples of the trivalent carboxylic acid include aromatic carboxylic acids (such as 1,2,3-benzenetricarboxylic acid, 1,2,4-benzenetricarboxylic acid, and 1,2,4-naphthalenetricarboxylic acid), anhydrides thereof, and lower alkyl esters (having, for example, 1 to 5 carbon atoms) thereof.

A dicarboxylic acid having a sulfonic group or a dicarboxylic acid having an ethylenic double bond may be used as the polycarboxylic acid in combination with any of the above dicarboxylic acids.

These polycarboxylic acids may be used alone or in combination of two or more thereof.

Examples of the polyhydric alcohol include aliphatic diols (e.g., linear aliphatic diols having a main chain with 7 to 20 carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. In particular, the aliphatic diol is preferably 1,8-octanediol, 1,9-nonanediol, or 1,10-decanediol.

A trivalent or higher alcohol having a crosslinked or branched structure may be used as the polyhydric alcohol in combination with a diol. Examples of the trivalent or higher alcohol include glycerin, trimethylolethane, trimethylolpropane, and pentaerythritol.

These polyhydric alcohols may be used alone or in combination of two or more thereof.

The content of the aliphatic diol in the polyhydric alcohol may be 80% by mole or more and is preferably 90% by mole or more.

The melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is determined by using a differential scanning calorimetry (DSC) curve obtained by DSC from the "melting peak temperature" described in melting temperature determination methods in "Testing methods for transition temperatures of plastics" in JIS K 7121-1987.

The weight-average molecular weight (Mw) of the crystalline polyester resin may be 6,000 or more and 35,000 or less.

The crystalline polyester resin is obtained by, for example, a well-known production method as in the amorphous polyester.

From the viewpoint of rub resistance of images, the weight-average molecular weight (Mw) of the binder resin is preferably 5,000 or more and 1,000,000 or less, more preferably 7,000 or more and 500,000 or less, and particularly preferably 25,000 or more and 60,000 or less. The number-average molecular weight (Mn) of the binder resin is preferably 2,000 or more and 100,000 or less. The molecular weight distribution Mw/Mn of the binder resin is preferably 1.5 or more and 100 or less, and more preferably 2 or more and 60 or less.

The weight-average molecular weight and the number-average molecular weight of the binder resin are measured by gel permeation chromatography (GPC). The molecular weight measurement by GPC is performed by using a GPC measurement apparatus HLC-8120GPC manufactured by TOSOH Corporation and using a TSKgel SuperHM-M (15 cm) column manufactured by TOSOH Corporation and a tetrahydrofuran (THF) solvent. The weight-average molecular weight and the number-average molecular weight are calculated from the measurement results by using a molecular-weight calibration curve prepared with monodispersed polystyrene standard samples.

The content of the binder resin is preferably 40% by mass or more and 95% by mass or less, more preferably 50% by mass or more and 95% by mass or less, and still more preferably 60% by mass or more and 90% by mass or less based on the total mass of the resin particles.

Release Agent

Examples of the release agent include hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent is not limited to these waxes.

The melting temperature of the release agent is preferably 50° C. or higher and 110° C. or lower, and more preferably 60° C. or higher and 100° C. or lower.

The melting temperature is determined by using a differential scanning calorimetry (DSC) curve obtained by DSC from the "melting peak temperature" described in melting temperature determination methods in "Testing methods for transition temperatures of plastics" in JIS K 7121-1987.

The content of the release agent is preferably 1% by mass or more and 20% by mass or less, and more preferably 50 by mass or more and 15% by mass or less based on the total mass of the resin particles.

Other Additives

Examples of the other additives include publicly known additives such as a magnetic material, a charge control agent, and an inorganic powder. These additives are contained in the resin particles as internal additives. Characteristics etc. of resin particles The resin particles may each be a resin particle having a single-layer structure or a resin particle (core-shell particle) having a so-called core-shell structure that includes a core (core particle) and a covering layer (shell layer) covering the core. The resin particles having the core-shell structure each include, for example a core containing a binder resin, a fluorescent colorant, a color pigment, and optional components such as a release agent; and a covering layer containing a binder resin.

The volume-average particle size ($D_{50v}$) of the resin particles is preferably 2 μm or more and 10 μm or less, and more preferably 4 μm or more and 8 μm or less.

The volume-average particle size of the resin particles is measured by using Coulter Multisizer II (manufactured by Beckman Coulter, Inc.) and using, as an electrolyte, ISOTON-II (manufactured by Beckman Coulter, Inc.).

In the measurement, 0.5 mg or more and 50 mg or less of a measurement sample is added to 2 mL of a 5% by mass aqueous solution of a surfactant (preferably sodium alkylbenzene sulfonate) serving as a dispersant. The resulting mixture is added to 100 mL or more and 150 mL or less of the electrolyte.

The electrolyte in which the sample is suspended is subjected to a dispersion treatment for 1 minute by using an ultrasonic dispersion apparatus, and the sizes of particles within the range of 2 μm or more and 60 μm or less are then measured by using the Coulter Multisizer II with an aperture having an aperture diameter of 100 μm. The number of particles sampled is 50,000.

With regard to the particle sizes measured as described above, a cumulative distribution is determined on a volume basis from the small particle size side, and the particle size at a cumulative volume of 50% is defined as the volume-average particle size $D_{50v}$.

In the exemplary embodiment, the average circularity of the resin particles is not particularly limited. However, from the viewpoint of improving cleanability of the resin particles from an image carrier, the average circularity is preferably 0.91 or more and 0.98 or less, more preferably 0.94 or more and 0.98 or less, and still more preferably 0.95 or more and 0.97 or less.

In the exemplary embodiment, the circularity of a resin particle is represented by (the peripheral length of a circle having the same area as a projection image of the particle/the peripheral length of the projection image of the particle). The average circularity of the resin particles is the circularity at which a cumulative value determined from the small circularity side in the circularity distribution is 5096. The average circularity of the resin particles is determined by analyzing at least 3,000 resin particles with a flow-type particle image analyzer.

When the resin particles are produced by, for example, an aggregation-coalescence method, the average circularity of the resin particles can be controlled by adjusting the stirring rate of a dispersion, the temperature of the dispersion, or the holding time in a fusion/coalescence step. External additive In the case where the resin particles are used as a toner for electrostatic image development described later, the resin particles may include an external additive, as needed.

The resin particles may be resin particles having no external additive or resin particles obtained by externally adding an external additive to resin particles.

Examples of the external additive include inorganic particles. Examples of the inorganic particles include particles of $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO·SiO_2$, $K_2O·(TiO_2)_n$, $Al_2O_3·2SiO_2$, $CaCO_3$, $MgCO_3$, $BaSO_4$, and $MgSO_4$.

The surfaces of the inorganic particles serving as the external additive may be subjected to a hydrophobic treatment. The hydrophobic treatment is performed by, for example, immersing the inorganic particles in a hydrophobizing agent. Examples of the hydrophobizing agent include, but are not particularly limited to, silane coupling agents, silicone oils, titanate coupling agents, and aluminum coupling agents. These hydrophobizing agents may be used alone or in combination of two or more thereof.

The amount of the hydrophobizing agent may be, for example, 1 part by mass or more and 10 parts by mass or less relative to 100 parts by mass of the inorganic particles.

Examples of the external additive further include resin particles (particles of resins such as polystyrene, polymethyl methacrylate (PMMA), and melamine resins) and cleaning activating agents (such as metal salts of higher fatty acids typified by zinc stearate, and particles of fluorine-based polymers).

The amount of the external additive added externally is, for example, preferably 0.01% by mass or more and 10% by mass or less, and more preferably 0.01% by mass or more and 6% by mass or less based on the mass of the resin particles.

Applications of Resin Particles

The resin particles according to the exemplary embodiment are suitably used as resin particles for image formation, and more suitably used as a toner for electrostatic image development.

The resin particles according to the present exemplary embodiment are suitably used as a powder coating material. The resin particles can be used for producing a coated product by applying the resin particles to a surface to be coated, and subsequently performing heating (baking) to form a coating film in which a powder is cured. In this case, the coating and heating (baking) may be performed at a time.

The coating of the powder may be performed by using a well-known coating method such as spray coating, electrostatic powder coating, frictional electrification powder coating, or fluidized-bed coating. The coating film of the powder may have a thickness of, for example, 30 µm or more and 50 µm or less.

The heating temperature (baking temperature) is, for example, preferably 90° C. or higher and 250° C. or lower, more preferably 100° C. or higher and 220° C. or lower, and still more preferably 120° C. or higher and 200° C. or lower. The heating time (baking time) is adjusted according to the heating temperature (baking temperature).

Examples of the article to be coated with the powder include, but are not particularly limited to, various metal parts, ceramic parts, and resin parts. These articles to be coated may each be a product that has not been formed into an article such as a plate-like article or a linear article, or a product that has been formed into an article for, for example, an electronic part, a road vehicle, or a building interior or exterior material. The surface of the article to be coated may be preliminarily subjected to a surface treatment such as a primer treatment, a plating process, or electrodeposition coating.

Alternatively, in the fields other than coating, the resin particles according to the exemplary embodiment are suitably used as resin particles for toner display.

In the known toner display, charged resin particles are dispersed in a medium (in many cases, air), and the resin particles are moved by an electric field to thereby display an image. The resin particles according to the exemplary embodiment are employed in this system without a problem. For example, the resin particles are placed in a cell sandwiched between two transparent electrodes, and the resin particles are moved by applying a voltage to display an image.

Method for Producing Resin Particles

Next, a method for producing the resin particles according to the present exemplary embodiment will be described.

The resin particles according to the exemplary embodiment may be obtained by producing resin particles and then externally adding an external additive to the resin particles.

The resin particles may be produced by a dry production method (such as a kneading-pulverization method) or by a wet production method (such as an aggregation-coalescence method, a suspension polymerization method, or a dissolution-suspension method). However, the production method is not particularly limited, and any publicly known production method may be employed. Among these methods, the aggregation-coalescence method may be employed to produce the resin particles.

Examples of the aggregation-coalescence method include the methods described in Japanese Unexamined Patent Application Publication Nos. 2010-97101 and 2006-154641.

An example of the kneading-pulverization method is the method described in Japanese Unexamined Patent Application Publication No. 2000-267338.

An example of the dissolution-suspension method is the method described in Japanese Unexamined Patent Application Publication No. 2000-258950.

Specifically, when the resin particles are produced by, for example, the aggregation-coalescence method, the resin particles are produced through a step of preparing a resin particle dispersion in which resin particles used as a binder resin are dispersed (a resin particle dispersion preparation step); a step of aggregating the resin particles (and other particles as needed) in the resin particle dispersion (in a dispersion obtained after mixing with another particle dispersion as needed) to form aggregated particles (an aggregated particle formation step); and a step of heating an aggregated particle dispersion in which the aggregated particles are dispersed to fuse and coalesce the aggregated particles to form resin particles (a fusion/coalescence step).

Hereafter, these steps will be described in detail.

In the following, a method for obtaining resin particles including a colorant and a release agent will be described, but the release agent is optionally used. Of course, additives other than the release agent may be used.

In the following description, the colorant may be at least one colorant selected from the group consisting of the fluorescent colorant and the color pigment. Both a fluorescent colorant particle dispersion and a color pigment particle dispersion may be used as a colorant particle dispersion. Alternatively, a dispersion including both fluorescent colorant particles and color pigment particles may be used as a colorant particle dispersion.

Resin Particle Dispersion Preparation Step

A resin particle dispersion in which resin particles used as a binder resin are dispersed is prepared. Furthermore, a colorant particle dispersion in which colorant particles are dispersed, and, for example, a release agent particle dispersion in which release agent particles are dispersed are prepared.

The resin particle dispersion is prepared by, for example, dispersing resin particles in a dispersion medium with a surfactant.

Examples of the dispersion medium used for the resin particle dispersion include aqueous media.

Examples of the aqueous medium include water such as distilled water and ion-exchange water, and alcohols. These aqueous media may be used alone or in combination of two or more thereof.

Examples of the surfactant include anionic surfactants such as sulfate-based surfactants, sulfonate-based surfactants, phosphate-based surfactants, and soap-based surfactants; cationic surfactants such as amine salt surfactants and quaternary ammonium salt surfactants; and nonionic surfactants such as polyethylene glycol-based surfactants, alkylphenol ethylene oxide adduct-based surfactants, and polyhydric alcohol-based surfactants. Of these, an anionic surfactant or a cationic surfactant may be used. A nonionic surfactant may be used in combination with an anionic surfactant or a cationic surfactant.

In particular, a nonionic surfactant is preferably used. A nonionic surfactant and an anionic surfactant or a cationic surfactant are preferably used in combination.

As described above, when a fluorescent colorant having an anionic group and a binder resin having a cationic group are used in the method for producing the resin particles, a surfactant having a cationic group is preferably used from the viewpoint of fluorescence intensity and graininess of images. On the other hand, when a fluorescent colorant having a cationic group and a binder resin having an anionic group are used in the method for producing the resin particles, a surfactant having an anionic group is preferably used from the viewpoint of fluorescence intensity and graininess of images.

These surfactants may be used alone or in combination of two or more thereof.

Examples of the method for dispersing the resin particles in the dispersion medium to form the resin particle dispersion include typical dispersing methods that use, for example, a rotary shearing-type homogenizer, a ball mill with media, a sand mill, or a dyno-mill. For some types of resin particles, the resin particles may be dispersed in the dispersion medium by a phase inversion emulsification method. The phase inversion emulsification method is a method including dissolving a resin to be dispersed in a hydrophobic organic solvent that can dissolve the resin, neutralizing an organic continuous phase (O phase) by adding a base thereto, and then performing phase inversion from W/O to O/W by pouring an aqueous medium (W phase) to thereby disperse the resin in the form of particles in the aqueous medium.

The volume-average particle size of the resin particles dispersed in the resin particle dispersion is, for example, preferably 0.01 µm or more and 1 µm or less, more preferably 0.03 µm or more and 0.8 µm or less, and still more preferably 0.05 µm or more and 0.6 µm or less.

The volume-average particle size of the resin particles is measured as follows. A particle size distribution measured by a laser diffraction particle size distribution measurement apparatus (for example, LA-700 manufactured by HORIBA, Ltd.) is divided into particle size ranges (channels). A cumulative volume distribution is determined from the small particle size side with respect to the particle size ranges (channels). The particle size at which the cumulative volume is 50% of all particles is measured as the volume-average particle size D50v. The volume-average particle sizes of the particles in other dispersions are measured in the same manner.

The content of the resin particles contained in the resin particle dispersion is preferably 5% by mass or more and 50% by mass or less, and more preferably 10% by mass or more and 40% by mass or less.

In the description below, the resin particles are resin particles to which a fluorescent colorant is chemically bonded or resin particles to which a fluorescent colorant is molecularly dispersed, unless otherwise specified.

A colorant particle dispersion and, for example, a release agent particle dispersion are also prepared as in the above resin particle dispersion. Specifically, the above descriptions of the volume-average particle size of the particles, the dispersion medium, the dispersing method, and the content of the particles in the resin particle dispersion apply to those for colorant particles dispersed in the colorant particle dispersion and release agent particles dispersed in the release agent particle dispersion.

Aggregated Particle Formation Step

Next, the resin particle dispersion, the colorant particle dispersion, and the release agent particle dispersion are mixed.

Subsequently, the resin particles, the colorant particles, and the release agent particles are hetero-aggregated in the dispersion mixture to form aggregated particles including the resin particles, the colorant particles, and the release agent particles and having sizes close to the sizes of desired resin particles.

Specifically, for example, a flocculant is added to the dispersion mixture, and the pH of the dispersion mixture is adjusted to acidic (e.g., a pH of 2 or more and 5 or less). A dispersion stabilizer is optionally added, and the resulting mixture is then heated to a temperature close to the glass transition temperature of the resin particles (specifically, for example, a temperature of the glass transition temperature of the resin particles −30° C. or higher and the glass transition temperature −10° C. or lower) to aggregate the particles dispersed in the dispersion mixture. Thus, aggregated particles are formed.

In the aggregated particle formation step, for example, while the dispersion mixture is stirred in a rotary shearing-type homogenizer, the flocculant may be added at room temperature (e.g., 25° C.), and the pH of the dispersion mixture may be adjusted to acidic (e.g., a pH of 2 or more and 5 or less). The dispersion stabilizer may be optionally added, and the resulting mixture may then be heated.

Examples of the flocculant include surfactants having a polarity opposite to the polarity of the surfactant contained in the dispersion mixture, inorganic metal salts, and divalent or higher metal complexes. When a metal complex is used as the flocculant, the amount of the surfactant used can be reduced, and charging characteristics are improved.

An additive that forms a complex with a metal ion in the flocculant or a similar bond may be optionally used together with the flocculant. A chelating agent may be used as the additive.

Examples of the inorganic metal salts include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the flocculant added is preferably 0.01 parts by mass or more and 5.0 parts by mass or less, and more preferably 0.1 parts by mass or more and less than 3.0 parts by mass relative to 100 parts by mass of the resin particles.

Fusion/Coalescence Step

Next, the resulting aggregated particle dispersion in which the aggregated particles are dispersed is heated to, for example, a temperature that is equal to or higher than the glass transition temperature of the resin particles (e.g., equal to or higher than a temperature 30° C. to 50° C. higher than the glass transition temperature of the resin particles) and that is equal to or higher than the melting temperature of the release agent to fuse and coalesce the aggregated particles. Thus, resin particles are formed.

In the fusion/coalescence step, the resin and the release agent are fused together at the temperature that is equal to or higher than the glass transition temperature of the resin particles and that is equal to or higher than the melting temperature of the release agent. Subsequently, cooling is performed to obtain resin particles.

The aspect ratio of the release agent in the resin particles can be adjusted by the following methods. During cooling, the dispersion is held at a temperature around the solidification point of the release agent for a certain period of time to cause crystal growth. Alternatively, two or more release agents having different melting temperatures are used to thereby promote crystal growth during cooling.

The resin particles are obtained through the steps described above.

Alternatively, the resin particles may be produced through a step of, after the preparation of the aggregated particle dispersion in which the aggregated particles are dispersed, further mixing the aggregated particle dispersion with a resin particle dispersion in which resin particles are dispersed, and causing aggregation such that the resin particles further adhere to the surfaces of the aggregated particles to thereby form second aggregated particles; and a step of heating a second aggregated particle dispersion in which the second aggregated particles are dispersed to fuse and coalesce the second aggregated particles to thereby form resin particles having a core-shell structure.

After completion of the fusion/coalescence step, the resin particles formed in the solution are subjected to a publicly known washing step, solid-liquid separation step, and drying step to obtain dried resin particles. From the viewpoint of chargeability, the washing step may be performed by sufficient displacement washing with ion-exchange water. From the viewpoint of productivity, the solid-liquid separation step may be performed by, for example, suction filtration or pressure filtration. From the viewpoint of productivity, the drying step may be performed by, for example, freeze-drying, flash drying, fluidized drying, or vibrating fluidized drying.

When the resin particles according to the exemplary embodiment are used as a toner for electrostatic image development, the toner is produced by, for example, adding an external additive to the dried resin particle obtained as described above and mixing the resulting mixture. The mixing may be performed by using, for example, a V-blender, a Henschel mixer, or a Loedige mixer.

Furthermore, if necessary, coarse particles in the resin particles may be removed by using, for example, a vibrating sieve machine or an air sieve machine.

Electrostatic Image Developer

When the resin particles according to the exemplary embodiment are used as an electrostatic image developer, the electrostatic image developer may be a one-component developer including only the resin particles according to the exemplary embodiment or may be a two-component developer including a mixture of the resin particles and a carrier.

The carrier is not particularly limited, and a publicly known carrier may be used. Examples of the carrier include a coated carrier prepared by coating the surface of a core formed of a magnetic powder with a resin, a magnetic powder-dispersed carrier prepared by blending a magnetic powder so as to be dispersed in a matrix resin, and a resin-impregnated carrier prepared by impregnating a porous magnetic powder with a resin. The magnetic powder-dispersed carrier and the resin-impregnated carrier may each be a carrier in which the particles constituting such a carrier serve as cores and the surfaces of the cores are coated with a resin.

Examples of the material of the magnetic powder include magnetic metals such as iron, nickel, and cobalt; and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicone resins having organosiloxane bonds and modified resins thereof, fluororesins, polyesters, polycarbonates, phenolic resins, and epoxy resins. The coating resin and the matrix resin may contain additives such as electrically conductive particles. Examples of the electrically conductive particles include particles of metals such as gold, silver, and copper; and particles of carbon black, titanium oxide, zinc oxide, tin oxide, barium sulfate, aluminum borate, and potassium titanate.

From the viewpoint of suppressing density unevenness in an image to be obtained, in particular, a carrier having a surface coated with a resin including a silicone resin is preferred, and a carrier having a surface coated with a silicone resin is more preferred.

An example of the method for coating the surface of the core material with a resin includes coating the surface of the core material with a coating layer-forming solution prepared by dissolving the coating resin and additives (optionally used) in an appropriate solvent. The solvent is not particularly limited and may be selected in consideration of, for example, the type of the resin used and coatability. Specific examples of the resin coating method include an immersion method in which the core material is immersed in the coating layer-forming solution, a spray method in which the coating layer-forming solution is sprayed onto the surface of the core material, a fluidized bed method in which the coating layer-forming solution is sprayed onto the core material while the core material is floated by fluidizing air, and a kneader-coater method in which the core material and the coating layer-forming solution are mixed in a kneader coater and a solvent is then removed.

The mixing ratio (mass ratio) of the resin particles (toner for electrostatic image development) and the carrier in the two-component developer is preferably resin particles (toner for electrostatic image development):carrier=1:100 to 30:100 and more preferably 3:100 to 20:100.

Image Forming Apparatus and Image Forming Method

A description will be made of an image forming apparatus and an image forming method where the resin particles according to the exemplary embodiment are used as a toner for electrostatic image development.

The image forming apparatus includes an image carrier, a charging unit that charges a surface of the image carrier, an electrostatic image forming unit that forms an electrostatic image on the charged surface of the image carrier, a developing unit that contains an electrostatic image developer and that develops the electrostatic image formed on the surface of the image carrier by using the electrostatic image developer to form a toner image, a transfer unit that transfers the toner image formed of the surface of the image carrier onto a surface of a recording medium, and a fixing unit that fixes the toner image transferred onto the surface of the recording medium. The electrostatic image developer is an electrostatic image developer including the resin particles according to the exemplary embodiment.

In the image forming apparatus, an image forming method is performed. The image forming method includes a charging step of charging a surface of an image carrier, an electrostatic image-forming step of forming an electrostatic image on the charged surface of the image carrier, a development step of developing the electrostatic image formed on the surface of the image carrier by using an electrostatic image developer including the resin particles according to the exemplary embodiment to form a toner image, a transfer step of transferring the toner image formed on the surface of the image carrier onto a surface of a recording medium, and a fixing step of fixing the toner image transferred onto the surface of the recording medium.

The image forming apparatus may be applied to publicly known image forming apparatuses such as a direct transfer-type apparatus that transfers a toner image formed on a surface of an image carrier directly onto a recording medium, an intermediate transfer-type apparatus that first-transfers a toner image formed on a surface of an image carrier onto a surface of an intermediate transfer body and second-transfers the toner image transferred onto the surface of the intermediate transfer body onto a surface of a recording medium, an apparatus including a cleaning unit that cleans a surface of an image carrier after transfer of a toner image but before charging, and an apparatus including a charge erasing unit that erases charges on a surface of an image carrier after transfer of a toner image but before charging by irradiating the surface of the image carrier with charge erasing light.

When the image forming apparatus is the intermediate transfer-type apparatus, the transfer unit includes, for example, an intermediate transfer body having a surface onto which a toner image is to be transferred, a first transfer unit that first-transfers a toner image formed on a surface of an image carrier onto the surface of the intermediate transfer body, and a second transfer unit that second-transfers the toner image transferred onto the surface of the intermediate transfer body onto a surface of a recording medium.

In the image forming apparatus, for example, a portion including the developing unit may have a cartridge structure (process cartridge) that is attachable to and detachable from the image forming apparatus. The process cartridge used may be, for example, a process cartridge that includes a developing unit containing an electrostatic image developer including the resin particles according to the exemplary embodiment.

A non-limiting example of the image forming apparatus will now be described. In the description below, major components illustrated in the figure will be described, and a description of other components will be omitted.

FIG. 1 is a schematic diagram of an image forming apparatus used in the exemplary embodiment.

The image forming apparatus illustrated in FIG. 1 includes first to fourth electrophotographic image forming units 10Y, 10M, 10C, and 10K (image forming units) that output yellow (Y), magenta (M), cyan (C), and black (K) images, respectively, on the basis of color-separated image data. These image forming units (hereinafter simply referred to as "units") 10Y, 10M, 10C, and 10K are arranged in a horizontal direction so as to be spaced apart from each other by a predetermined distance. These units 10Y, 10M, 10C, and 10K may be process cartridges that are attachable to and detachable from the image forming apparatus.

An intermediate transfer belt (an example of the intermediate transfer body) 20 is disposed above the units 10Y, 10M, 10C, and 10K so as to extend through the units. The intermediate transfer belt 20 is wound around a driving roller 22 and a support roller 24 that are in contact with the inner surface of the intermediate transfer belt 20 and is configured to run in a direction from the first unit 10Y toward the fourth unit 10K. A force is applied to the support roller 24 by a spring or the like (not shown) in a direction away from the driving roller 22, so that a tension is applied to the intermediate transfer belt 20 wound around the two rollers. An intermediate transfer belt cleaning device 30 is disposed on an image carrying surface of the intermediate transfer belt 20 so as to face the driving roller 22.

Yellow, magenta, cyan, and black toners contained in toner cartridges 8Y, 8M, 8C, and 8K, respectively, are supplied to developing devices (examples of the developing units) 4Y, 4M, 4C, and 4K of the units 10Y, 10M, 10C, and 10K, respectively.

The first to fourth units 10Y, 10M, 10C, and 10K have substantially the same configuration and operate similarly. Therefore, the first unit 10Y that is disposed upstream in the direction in which the intermediate transfer belt runs and that forms a yellow image will be described as a representative example.

The first unit 10Y includes a photoreceptor 1Y serving as an image carrier. A charging roller (an example of the charging unit) 2Y, an exposure device (an example of the electrostatic image forming unit) 3, a developing device (an example of the developing unit) 4Y, a first transfer roller (an example of the first transfer unit) 5Y, and a photoreceptor cleaning device (an example of an image carrier cleaning unit) 6Y are disposed around the photoreceptor 1Y in this order. The charging roller 2Y charges the surface of the photoreceptor 1Y to a predetermined potential. The exposure device 3 exposes the charged surface to a laser beam 3Y emitted in accordance with a color-separated image signal to thereby form an electrostatic image. The developing device 4Y supplies a charged toner to the electrostatic image to develop the electrostatic image. The first transfer roller 5Y transfers the developed toner image onto the intermediate transfer belt 20. The photoreceptor cleaning device 6Y removes the toner remaining on the surface of the photoreceptor 1Y after the first transfer.

The first transfer roller 5Y is disposed on the inner side of the intermediate transfer belt 20 and located at a position facing the photoreceptor 1Y. Bias power supplies (not shown) that apply a first transfer bias are connected to the respective first transfer rollers 5Y, 5M, 5C, and 5K of the units. The bias power supplies are controlled by a controller (not shown) to change the value of the transfer bias applied to the first transfer rollers.

An operation for forming a yellow image in the first unit 10Y will now be described.

First, prior to the operation, the surface of the photoreceptor 1Y is charged by the charging roller 2Y to a potential of −600 V to −800 V.

The photoreceptor 1Y is produced by forming a photosensitive layer on a conductive substrate (having a volume resistivity of, for example, $1 \times 10^{-6}$ Ωcm or less at 20° C.). The photosensitive layer usually has a high resistance (the resistance of a typical resin) but has the property that, when irradiated with a laser beam, the specific resistance of a portion that has been irradiated with the laser beam is changed. Accordingly, the charged surface of the photoreceptor 1Y is irradiated with a laser beam 3Y emitted from the exposure device 3 in accordance with yellow image data sent from a controller (not shown). Consequently, an electrostatic image with a yellow image pattern is formed on the surface of the photoreceptor 1Y.

The electrostatic image is an image formed on the surface of the photoreceptor 1Y by charging and is a so-called negative latent image formed in the following manner. The specific resistance of regions of the photosensitive layer, the regions being irradiated with the laser beam 3Y, decreases, so that charges on the surface of the photoreceptor 1Y flow out, whereas the charges in regions that are not irradiated with the laser beam 3Y remain.

The electrostatic image formed on the photoreceptor 1Y rotates to a predetermined developing position as the photoreceptor 1Y runs. The electrostatic image on the photoreceptor 1Y at this developing position is then developed and visualized as a toner image by the developing device 4Y.

The developing device 4Y contains an electrostatic image developer including, for example, at least a yellow toner and a carrier. The yellow toner is stirred in the developing device 4Y and thereby frictionally charged. The charged yellow toner has a charge having the same polarity (negative polarity) as the charge on the photoreceptor 1Y and is held on a developer roller (an example of a developer holding member). As the surface of the photoreceptor 1Y passes through the developing device 4Y, the yellow toner electrostatically adheres to charge-erased latent image portions on the surface of the photoreceptor 1Y, and the latent image is thereby developed with the yellow toner. The photoreceptor 1Y having the yellow toner image thereon continues to run at a predetermined speed, and the toner image developed on the photoreceptor 1Y is transported to a predetermined first transfer position.

When the yellow toner image on the photoreceptor 1Y is transported to the first transfer position, a first transfer bias is applied to the first transfer roller 5Y, and an electrostatic force directed from the photoreceptor 1Y toward the first transfer roller 5Y acts on the toner image. Thus, the toner image on the photoreceptor 1Y is transferred onto the intermediate transfer belt 20. The transfer bias applied at this time has a (+) polarity opposite to the (−) polarity of the toner and is controlled by the controller (not shown) to, for example, +10 μA in the first unit 10Y. The toner remaining on the photoreceptor 1Y is removed and collected by the photoreceptor cleaning device 6Y.

The first transfer biases applied to the first transfer rollers 5M, 5C, and 5K of the second unit 10M and subsequent units are also controlled according to the first unit.

The intermediate transfer belt 20 on which the yellow toner image has been transferred in the first unit 10Y is sequentially transported through the second to fourth units 10M, 10C and 10K, and toner images of respective colors are transferred on top of each other.

The intermediate transfer belt 20 to which the four color toner images have been transferred on top of each other through the first to fourth units reaches a second transfer portion that is composed of the intermediate transfer belt 20, the support roller 24 in contact with the inner surface of the intermediate transfer belt, and a second transfer roller (an example of the second transfer unit) 26 disposed on the image carrying surface of the intermediate transfer belt 20. A recording sheet (an example of the recording medium) P is supplied to a gap between the second transfer roller 26 and the intermediate transfer belt 20 that are in contact with each other at a predetermined timing through a supply mechanism, and a second transfer bias is applied to the support roller 24. The transfer bias applied at this time has the same polarity (−) as the polarity (−) of the toner, and an electrostatic force directed from the intermediate transfer belt 20 toward the recording sheet P acts on the toner images. Thus, the toner images on the intermediate transfer belt 20 are transferred onto the recording sheet P. The second transfer bias applied at this time is determined according to a resistance detected by resistance detector (not shown) that detects the resistance of the second transfer portion and is controlled in terms of voltage.

The recording sheet P to which the toner images are transferred is sent to a pressure contact portion (nip) of a pair of fixing rollers in a fixing device (an example of the fixing unit) 28, and the toner images are fixed onto the recording sheet P to thereby form a fixed image. The recording sheet P to which the color image has been fixed is transported to an ejection portion, and a series of the color image formation operations is completed.

Examples of the recording sheet P onto which toner images are transferred include plain paper used for, for example, electrophotographic copying machines and printers. Examples of the recording medium include OHP sheets besides the recording sheet P. In order to further improve the smoothness of the surfaces of images after fixing, the recording sheet P also preferably has a smooth surface. For example, coat paper produced by coating the surface of plain paper with a resin or the like, and art paper for printing are suitably used.

Process Cartridge and Toner Cartridge

A process cartridge in which the resin particles according to the exemplary embodiment are used as an electrostatic image developer includes a developing unit that contains the electrostatic image developer including the resin particles according to the exemplary embodiment and that develops an electrostatic image formed on the surface of an image carrier with the electrostatic image developer to form a toner image, the process cartridge being attachable to and detachable from an image forming apparatus.

The process cartridge may include the developing unit and optionally at least one selected from other units such as an image carrier, a charging unit, an electrostatic image forming unit, and a transfer unit.

Hereafter, a non-limiting example of the process cartridge will be described. In the following description, major components illustrated in the figure will be described, and a description of other components will be omitted.

Figure 2:
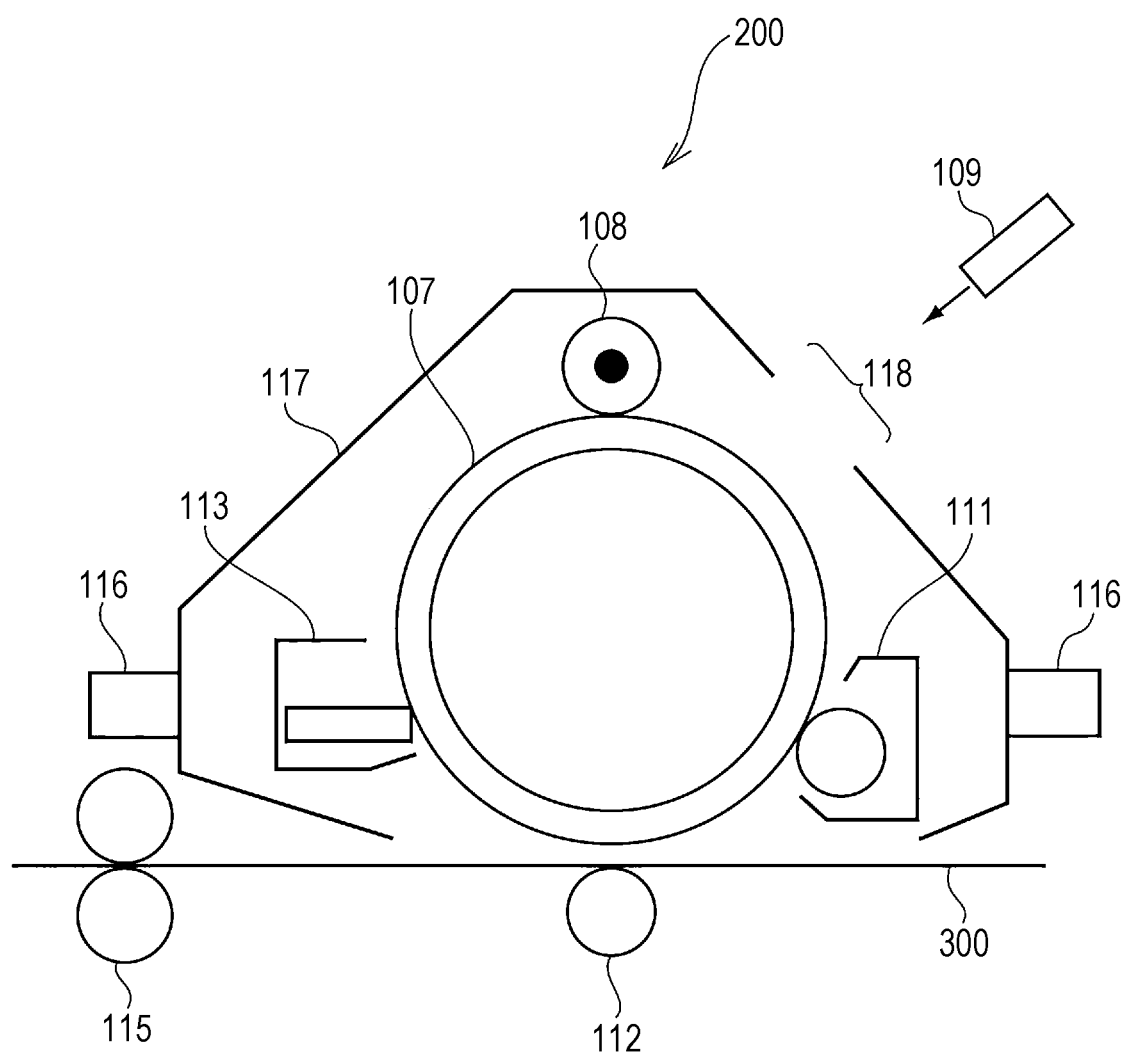
FIG. 2 is a schematic diagram of a process cartridge according to an exemplary embodiment.

FIG. 2 is a schematic diagram illustrating an example of the process cartridge used in the exemplary embodiment.

A process cartridge 200 illustrated in FIG. 2 includes, for example, a housing 117 having mounting rails 116 and an opening 118 for light exposure and further includes a photoreceptor 107 (an example of the image carrier) and a charging roller 108 (an example of the charging unit), a developing device 111 (an example of the developing unit), and a photoreceptor cleaning device 113 (an example of the cleaning unit) that are disposed around the photoreceptor 107. The housing 117 integrates and holds the photoreceptor 107, the charging roller 108, the developing device 111, and the photoreceptor cleaning device 113 to thereby form a cartridge.

FIG. 2 further illustrates an exposure device 109 (an example of the electrostatic image forming unit), and a transfer device 112 (an example of the transfer unit), a fixing device 115 (an example of the fixing unit), and a recording sheet 300 (an example of the recording medium).

Next, a toner cartridge will be described.

The toner cartridge contains the resin particles according to the exemplary embodiment as a toner for electrostatic image development and is attachable to and detachable from an image forming apparatus. The toner cartridge contains a replenishment toner to be supplied to the developing unit disposed in the image forming apparatus.

The image forming apparatus illustrated in FIG. 1 is configured so that the toner cartridges 8Y, 8M, 8C, and 8K are attachable to and detachable from the image forming apparatus. The developing devices 4Y, 4M, 4C, and 4K are connected to the toner cartridges of corresponding colors with toner supply tubes (not shown) therebetween. When the amount of the remaining toner contained in a toner cartridge becomes small, this toner cartridge is replaced.

EXAMPLES

Examples of the present disclosure will now be described. However, the present disclosure is not limited to these Examples. In the following description, "parts" and "%" are all based on mass, unless otherwise specified.

Example 1: Aggregation-Coalescence Method

Preparation of Fluorescent Colorant Particle Dispersion (1)
    Fluorescent colorant (Basic Red 1): 70 parts
    Anionic surfactant (manufactured by DKS Co. Ltd., Neogen RK): 30 parts
    Ion-exchange water: 200 parts The above materials are mixed and dispersed for 10 minutes by using a homogenizer (ULTRA-TURRAX T50, manufactured by IKA). Ion-exchange water is added such that the resulting dispersion has a solid content of 20% by mass to obtain a fluorescent colorant particle dispersion (1) in which colorant particles having a volume-average particle size of 140 nm are dispersed.

Preparation of Color Pigment Particle Dispersion (1)
    Color pigment (C.I. Pigment Violet 19): 70 parts
    Anionic surfactant (manufactured by DKS Co. Ltd., Neogen RK): 30 parts
    Ion-exchange water: 200 parts The above materials are mixed and dispersed for 10 minutes by using a homogenizer (ULTRA-TURRAX T50, manufactured by IKA). Ion-exchange water is added such that the resulting dispersion has a solid content of 20% by mass to obtain a color pigment particle dispersion (1) in which colorant particles having a volume-average particle size of 140 nm are dispersed.

Preparation of Resin Particle Dispersion (1)
    Terephthalic acid: 30 parts by mole
    Fumaric acid: 70 parts by mole
    Ethylene oxide adduct of bisphenol A: 5 parts by mole
    Propylene oxide adduct of bisphenol A: 95 parts by mole The above materials are placed in a flask equipped with a stirrer, a nitrogen inlet tube, a temperature sensor, and a distillation column, the temperature is increased to 220° C. over a period of 1 hour, and 1 part of titanium tetraethoxide is added relative to 100 parts of the materials. The temperature is increased to 230° C. over a period of 30 minutes while water generated is distilled off. A dehydration-condensation reaction is continued at this temperature for 1 hour, and the reaction product is then cooled. Thus, a polyester resin having a weight-average molecular weight of 18,000 and a glass transition temperature of 60° C. is obtained.

In a container equipped with a temperature-control unit and a nitrogen-purge unit, 40 parts of ethyl acetate and 25 parts of 2-butanol are placed to prepare a mixed solvent. Subsequently, 100 parts of the polyester resin is gradually added to the mixed solvent and dissolved. A 10% by mass aqueous ammonia solution is added thereto (in an amount corresponding to three times the acid value of the resin in terms of molar ratio), and stirring is performed for 30 minutes. Subsequently, the inside of the container is purged with dry nitrogen. The temperature is maintained at 40° C., and 400 parts of ion-exchange water is added dropwise at a rate of 2 parts/minute while the liquid mixture is stirred. After completion of the dropwise addition, the temperature is returned to room temperature (20° C. to 25° C.), and dry nitrogen is bubbled for 48 hours while stirring to thereby obtain a resin particle dispersion in which the amounts of ethyl acetate and 2-butanol are reduced to 1,000 ppm or less. Ion-exchange water is added to the resin particle dispersion so that the solid content is adjusted to 20% by mass. Thus, a resin particle dispersion (1) is obtained.

Preparation of Release Agent Particle Dispersion (1)
    Paraffin wax (manufactured by NIPPON SEIRO CO., LTD., HNP-9): 100 parts
    Anionic surfactant (manufactured by DKS Co. Ltd., Neogen RK): 1 part
    Ion-exchange water: 350 parts The above materials are mixed, heated to 100° C., and dispersed by using a homogenizer (trade name: ULTRA-TURRAX T50, manufactured by IKA). The resulting liquid is then subjected to a dispersion treatment using a Manton-Gaulin high-pressure homogenizer (manufactured by Gaulin Corporation) to obtain a release agent particle dispersion (1) (solid content: 20% by mass) in which release agent particles having a volume-average particle size of 200 nm are dispersed.

Preparation of Toner Particles (1)
    Resin particle dispersion (1): 60.8 parts
    Fluorescent colorant particle dispersion (1): 0.9 parts
    Color pigment particle dispersion (1): 0.9 parts
    Release agent particle dispersion (1): 6 parts
    Anionic surfactant (manufactured by DKS Co. Ltd.: Neogen RK, 20%): 1 part The above materials are placed in a round-bottom flask made of stainless steel, and 0.1 N (=mol/L) nitric acid is added thereto to adjust the pH to 3.5. Subsequently, 30 parts of an aqueous nitric acid solution having a polyaluminum chloride concentration of 10% by mass is added. Next, the resulting mixture is dispersed at a liquid temperature of 30° C. by using a homogenizer (trade name: ULTRA-TURRAX T50, manufactured by IKA), and the resulting dispersion is then heated to 45° C. in a heating oil bath and held for 30 minutes. Subsequently, 30.4 parts of the resin particle dispersion (1) is added, the resulting dispersion is held for 1 hour, and a 0.1 N aqueous sodium hydroxide solution is added to adjust the pH to 8.5. The dispersion is then heated to 84° C. and held for 2.5 hours. Next, the dispersion is cooled to 20° C. at a rate of 20° C./minute, and the solid matter is separated by filtration, sufficiently washed with ion-exchange water, and dried to obtain toner particles (1). The toner particles (1) have a volume-average particle size of 7 μm.

Preparation of Carrier 1
    Ferrite particles (average particle size: 35 μm): 100 parts
    Toluene: 14 parts
    Polymethyl methacrylate (PMMA, weight-average molecular weight: 75,000): 5 parts
    Carbon black: 0.2 parts (VXC-72, manufactured by Cabot Corporation, volume resistivity: 100 Ωcm or less)

The above materials except for the ferrite particles are dispersed in a sand mill to prepare a dispersion. This dispersion is placed in a vacuum degassing kneader together with the ferrite particles, and the resulting mixture is dried under reduced pressure while stirring to obtain a carrier 1.

Preparation of Toner
    Relative to 100 parts by mass of the toner particles (1) obtained as described above, 1.5 parts by mass of hydrophobic silica (RY50, manufactured by Nippon Aerosil Co., Ltd.) and 1.0 part by mass of hydrophobic titanium oxide (T805, manufactured by Nippon Aerosil Co., Ltd.) are added, and the resulting mixture is blended at 10,000 rpm (revolutions per minute) for 30 seconds by using a sample mill. The mixture is then sieved by using a vibrating sieve with a mesh size of 45 μm to prepare a toner 1 (toner for electrostatic image development). The toner 1 has a volume-average particle size of 7 μm.

Preparation of Electrostatic Image Developer

Eight parts of the toner 1 and 92 parts of the carrier 1 are mixed by using a V-blender to prepare a developer 1 (electrostatic image developer).

Example 2: Kneading-Pulverization Method

Linear polyester resin (linear amorphous polyester resin obtained from terephthalic acid/ethylene oxide adduct of bisphenol A/cyclohexanedimethanol: Tg=62° C., Mn=4,000, Mw=35,000, acid value=12 mgKOH/g, hydroxyl value=25 mgKOH/g): 88.1 parts
Fluorescent colorant pigment (Basic Red 1): 1.00 part
Color pigment (C.I. Pigment Violet 19): 0.90 part
Wax A (stearyl behenate, endotherm onset temperature: 47° C., melt viscosity at 120° C.: 50 mPa·s): 5 parts
Copolymerization petroleum resin (A) (C5-petroleum fraction (isoprene)/C5-petroleum fraction (piperylene)/isopropenyltoluene=monomer weight ratio (1.5/1.5/97), softening point: 125° C.): 5 parts A mixture of the above materials is kneaded with an extruder, and the resulting kneaded product is pulverized with a surface pulverization-type pulverizer. The pulverized product is then classified into fine particles and coarse particles with an air classifier. Thus, toner particles having a volume-average particle size D50 of 8.0 μm are obtained.

Preparation of Toner

Relative to 100 parts of the toner particles obtained as described above, 1.0 part of negatively chargeable silica particles having an average particle size of 40 nm and 0.5 parts of negatively chargeable titania particles having an average particle size of 15 nm are added to prepare a toner 2 (toner including an external additive).

Preparation of Electrostatic Image Developer

Next, 100 parts of a carrier prepared by coating ferrite particles having a particle size of 50 μm with a styrene-methacrylate copolymer is added to and mixed with 6 parts of the toner 2 to prepare a developer 2 (electrostatic image developer).

Examples 3 to 38 and Comparative Examples 1 to 6

Toners for electrostatic image development and electrostatic image developers are prepared as in Example 1 or Example 2 except that the type of fluorescent colorant, the type of color pigment, the contents of these (which are adjusted by changing the amounts of dispersions used in preparation of the toner), and the type of binder resin are changed as described in Tables 1 to 3.

Example 39: Styrene Acryl-EA Method

Preparation of Styrene-Acrylic Resin Particle Dispersion
Styrene: 308 parts
n-Butyl acrylate: 100 parts
Acrylic acid: 4 parts
Dodecanethiol: 6 parts
Propanediol diacrylate: 1.5 parts The above components are mixed and dissolved, and the dissolved mixture is added to an aqueous solution in which 4 parts of an anionic surfactant (manufactured by DKS Co. Ltd., Neogen SC) is dissolved in 550 parts of ion-exchange water, and emulsified in a flask. Subsequently, while the resulting emulsion is mixed for 10 minutes, an aqueous solution in which 6 parts of ammonium persulfate is dissolved in 100 parts of ion-exchange water is added to the emulsion. After the inside of the flask is purged with nitrogen, the flask is heated in an oil bath until the temperature of the content in the flask reaches 75° C. while the content is stirred, and, in this state, emulsion polymerization is continued for 5 hours. As a result, a styrene-acrylic resin particle dispersion (39) (resin particle concentration: 20%) is obtained in which resin particles having an average particle size of 195 nm and a weight-average molecular weight (Mw) of 34,000 are dispersed. The styrene-acrylic resin has a glass transition temperature of 52° C.

Preparation of Toner Particles (39)
Resin particle dispersion (39): 60.8 parts
Fluorescent colorant particle dispersion (39): 0.9 parts
Color pigment particle dispersion (39): 0.9 parts
Release agent particle dispersion (39): 6 parts
Anionic surfactant (manufactured by DKS Co. Ltd.: Neogen RK, 20%): 1 part The above materials are placed in a round-bottom flask made of stainless steel, and 0.1 N (=mol/L) nitric acid is added thereto to adjust the pH to 3.5. Subsequently, 30 parts of an aqueous nitric acid solution having a polyaluminum chloride concentration of 10% by mass is added. Next, the resulting mixture is dispersed at a liquid temperature of 30° C. by using a homogenizer (trade name: ULTRA-TURRAX T50, manufactured by IKA), and the resulting dispersion is then heated to 45° C. in a heating oil bath and held for 30 minutes. Subsequently, 30.4 parts of the resin particle dispersion (39) is added, the resulting dispersion is held for 1 hour, and a 0.1 N (=0.1 mol/L) aqueous sodium hydroxide solution is added to adjust the pH to 8.5. The dispersion is then heated to 84° C. and held for 2.5 hours. Next, the dispersion is cooled to 20° C. at a rate of 20° C./minute, and the solid matter is separated by filtration, sufficiently washed with ion-exchange water, and dried to obtain toner particles (39). The toner particles (39) have a volume-average particle size of 8 μm.

A toner for electrostatic image development and an electrostatic image developer are prepared as in Example 1 except that the toner particles (39) are used instead of the toner particles (1).

The following evaluations are performed by using the toners for electrostatic image development or the electrostatic image developers obtained in Examples 1 to 39 and Comparative Examples 1 to 6. Tables 1 to 3 summarize the evaluation results.

Evaluation Methods

Evaluation of Spectral Reflectance (Fluorescence Intensity)

The spectral reflectance of the toner is measured by the following method.

In an environmental room at a temperature of 25° C. and a humidity of 60% RH, a body, a developing device, and a toner cartridge of a DocuCentre Color 400 CP manufactured by Fuji Xerox Co., Ltd. are cleaned by sufficiently removing a developer and a toner that have been set therein, and a toner is then placed in the toner cartridge.

Next, an amount of a developing toner of a monochromatic 100% image on OS coated paper manufactured by Fuji Xerox Co., Ltd. is adjusted to 4.5 g/m2, an image formed of only the toner and having a size of 5 cm×5 cm is prepared. The spectral reflectance in the visible light region is measured at 10 random points in the image plane by using an X-Rite 939 (manufactured by X-Rite Inc., aperture: 4 mm). The spectral reflectance is calculated by averaging the results.

The spectral reflectance of the fluorescent colorant is determined by preparing a toner by using materials excluding only the color pigment as in the method for preparing a toner in each of Examples and Comparative Examples, and performing measurement and calculation by the same method as described above.

The spectral reflectance of the color pigment is determined by preparing a toner by using materials excluding only the fluorescent colorant as in the method for preparing a toner in each of Examples and Comparative Examples, and performing measurement and calculation by the same method as described above.

Color Gamut Evaluation

In an environmental room at a temperature of 25° C. and a humidity of 60% RH, a body, a developing device, and a toner cartridge of a DocuCentre Color 400 CP manufactured by Fuji Xerox Co., Ltd. are cleaned by sufficiently removing a developer and a toner that have been set therein. Subsequently, the prepared developer is placed in the developing device and a replenishment toner is placed in each toner cartridge.

Next, an amount of a developing toner of a monochromatic 100% image on OS coated paper manufactured by Fuji Xerox Co., Ltd. is adjusted to 4.5 g/m$^2$, an image formed of only the toner and having a size of 5 cm×5 cm is prepared, and the image density (L*), redness (a*), and blueness (b*) are measured. The measurement is performed in the image plane 10 times at random by using an X-Rite 939 (aperture: 4 mm), and the results are averaged to calculate the L*, and b*. Furthermore, ΔE between the image and a target color sample in Neons Guide available from PANTONE LLC or a target color sample in DIC Color Guide available from DIC Corporation is calculated.

TABLE 1

| | Fluorescent colorant 1 | | Fluorescent colorant 2 | | Fluorescence peak wavelength of fluorescent colorant (nm) | Hue angle of fluorescent colorant (°) | Color pigment 1 | | Color pigment 2 | |
|---|---|---|---|---|---|---|---|---|---|---|
| | Type | Content in resin particle (mass %) | Type | Content in resin particle (mass %) | | | Type | Content in resin particle (mass %) | Type | Content in resin particle (mass %) |
| Example 1 | Xanthene skeleton compound A | 0.90 | — | 0 | 560 | 8 | Quinacridone skeleton compound A | 0.90 | — | 0 |
| Example 2 | Xanthene skeleton compound A | 1.00 | — | 0 | 560 | 8 | Quinacridone skeleton compound A | 0.90 | — | 0 |
| Example 3 | Xanthene skeleton compound A | 0.70 | Xanthene skeleton compound B | 0.50 | 610 | 355 | Quinacridone skeleton compound A | 0.90 | — | 0 |
| Example 4 | Xanthene skeleton compound A | 0.75 | Xanthene skeleton compound B | 0.50 | 610 | 357 | Quinacridone skeleton compound A | 0.90 | — | 0 |
| Example 5 | Xanthene skeleton compound A | 0.90 | — | 0 | 560 | 8 | Quinacridone skeleton compound A | 0.70 | Quinacridone skeleton compound B | 0.50 |
| Example 6 | Xanthene skeleton compound A | 1.00 | — | 0 | 560 | 8 | Quinacridone skeleton compound A | 0.70 | Quinacridone skeleton compound B | 0.50 |
| Example 7 | Xanthene skeleton compound A | 0.70 | Xanthene skeleton compound B | 0.50 | 610 | 355 | Quinacridone skeleton compound A | 0.70 | Quinacridone skeleton compound B | 0.50 |
| Example 8 | Xanthene skeleton compound A | 0.75 | Xanthene skeleton compound B | 0.50 | 610 | 357 | Quinacridone skeleton compound A | 0.70 | Quinacridone skeleton compound B | 0.50 |
| Example 9 | Xanthene skeleton compound A | 0.65 | Xanthene skeleton compound B | 0.40 | 610 | 359 | Quinacridone skeleton compound A | 0.50 | Azo skeleton compound A | 0.02 |
| Example 10 | Xanthene skeleton compound A | 0.70 | Xanthene skeleton compound B | 0.40 | 610 | 3 | Quinacridone skeleton compound A | 0.50 | Azo skeleton compound A | 0.02 |
| Example 11 | Xanthene skeleton compound A | 0.60 | Xanthene skeleton compound B | 0.30 | 610 | 355 | Quinacridone skeleton compound A | 0.50 | Azo skeleton compound A | 0.02 |
| Example 12 | Xanthene skeleton compound A | 0.65 | Xanthene skeleton compound B | 0.30 | 610 | 355 | Quinacridone skeleton compound A | 0.50 | Azo skeleton compound A | 0.02 |
| Example 13 | Compound A having heterocyclic structure formed of benzimidazole skeleton and coumarin skeleton | 0.90 | — | 0 | 520 | 110 | Azo skeleton compound A | 0.80 | — | 0 |

TABLE 1-continued

| Example | Compound A having heterocyclic structure | | Fluorescent colorant | Difference in hue angle (°) | Sum of spectral reflectances of fluorescent colorants (%) | Integrated value of spectral reflectance of color pigment in wavelength A ± 30 nm | Color pigment | | ΔE between image and target color |
|---|---|---|---|---|---|---|---|---|---|
| Example 14 | Compound A having heterocyclic structure formed of benzimidazole skeleton and coumarin skeleton | 0.90 | — | 0 | 520 | 110 | Benzimidazolone skeleton compound A | 0.80 | 0 |
| Example 15 | Compound A having heterocyclic structure formed of benzimidazole skeleton and coumarin skeleton | 0.90 | Xanthene skeleton compound A | 0.1 | 520 | 110 | Benzimidazolone skeleton compound A | 0.80 | 0 |
| Example 16 | Compound A having heterocyclic structure formed of benzimidazole skeleton and coumarin skeleton | 0.90 | Xanthene skeleton compound A | 0.1 | 520 | 110 | Azo skeleton compound A | 0.70 | 0 |
| Example 17 | Compound A having heterocyclic structure formed of benzimidazole skeleton and coumarin skeleton | 0.80 | Xanthene skeleton compound A | 0.05 | 520 | 110 | Azo skeleton compound A | 0.70 | 0 |
| Example 18 | Compound A having heterocyclic structure formed of benzimidazole skeleton and coumarin skeleton | 0.80 | Xanthene skeleton compound A | 0.05 | 520 | 110 | Azo skeleton compound A | 0.70 | 0 |

| Example | Type of binder resin | Method for producing resin particle | Hue angle of resin particle (°) | Difference in hue angle (°) | Sum of spectral reflectances of fluorescent colorants (%) | Integrated value of spectral reflectance of color pigment in wavelength A ± 30 nm | Fluorescence intensity of resin particle (%) | Target color | ΔE between image and target color |
|---|---|---|---|---|---|---|---|---|---|
| Example 1 | Amorphous polyester resin | Aggregation-coalescence method | 346 | 22 | 150 | 2,600 | 109 | DIC584B | 9 |
| Example 2 | Amorphous polyester resin | Kneading-pulverization method | 345 | 23 | 150 | 2,600 | 110 | DIC584B | 10 |
| Example 3 | Amorphous polyester resin | Aggregation-coalescence method | 347 | 8 | 155 | 3,200 | 115 | DIC584B | 8 |
| Example 4 | Amorphous polyester resin | Kneading-pulverization method | 346 | 11 | 155 | 3,200 | 115 | DIC584B | 8 |
| Example 5 | Amorphous polyester resin | Aggregation-coalescence method | 346 | 22 | 150 | 2,700 | 112 | DIC584B | 7 |
| Example 6 | Amorphous polyester resin | Kneading-pulverization method | 345 | 23 | 150 | 2,700 | 111 | DIC584B | 10 |
| Example 7 | Amorphous polyester resin | Aggregation-coalescence method | 350 | 5 | 155 | 3,400 | 117 | DIC584B | 2 |
| Example 8 | Amorphous polyester resin | Kneading-pulverization method | 350 | 7 | 155 | 3,400 | 116 | DIC584B | 3 |
| Example 9 | Amorphous polyester resin | Aggregation-coalescence method | 355 | 4 | 155 | 3,600 | 117 | DIC584 | 2 |
| Example 10 | Amorphous polyester resin | Kneading-pulverization method | 355 | 8 | 155 | 3,600 | 116 | DIC584 | 2 |

TABLE 1-continued

| | | | | | | | | |
|---|---|---|---|---|---|---|---|---|
| Example 11 | Amorphous polyester resin | Aggregation-coalescence method | 352 | 3 | 150 | 3,700 | 119 | PANTONE 806C | 9 |
| Example 12 | Amorphous polyester resin | Kneading-pulverization method | 352 | 3 | 150 | 3,700 | 119 | PANTONE 806C | 10 |
| Example 13 | Amorphous polyester resin | Aggregation-coalescence method | 100 | 10 | 120 | 2,500 | 109 | DIC590 | 5 |
| Example 14 | Amorphous polyester resin | Kneading-pulverization method | 100 | 10 | 120 | 2,500 | 108 | DIC590 | 6 |
| Example 15 | Amorphous polyester resin | Aggregation-coalescence method | 70 | 40 | 120 | 2,500 | 108 | DIC589 | 6 |
| Example 16 | Amorphous polyester resin | Kneading-pulverization method | 70 | 40 | 120 | 2,500 | 108 | DIC589 | 6 |
| Example 17 | Amorphous polyester resin | Aggregation-coalescence method | 95 | 15 | 120 | 2,500 | 111 | PANTONE 803C | 9 |
| Example 18 | Amorphous polyester resin | Kneading-pulverization method | 95 | 15 | 120 | 2,500 | 111 | PANTONE 803C | 10 |

TABLE 2

| | Fluorescent colorant 1 | | Fluorescent colorant 2 | | Fluorescence peak wavelength of fluorescent colorant (nm) | Hue angle of fluorescent colorant (°) | Color pigment 1 | | Color pigment 2 | |
|---|---|---|---|---|---|---|---|---|---|---|
| | Type | Content in resin particle (mass %) | Type | Content in resin particle (mass %) | | | Type | Content in resin particle (mass %) | Type | Content in resin particle (mass %) |
| Example 19 | Triarylmethane skeleton compound A | 1.20 | — | 0 | 510 | 145 | Phthalocyanine skeleton compound A | 0.20 | — | 0 |
| Example 20 | Triarylmethane skeleton compound A | 1.20 | — | 0 | 510 | 145 | Phthalocyanine skeleton compound A | 0.20 | — | 0 |
| Example 21 | Triarylmethane skeleton compound A | 1.20 | — | 0 | 510 | 145 | Phthalocyanine skeleton compound A | 0.20 | — | 0 |
| Example 22 | Triarylmethane skeleton compound A | 1.20 | — | 0 | 510 | 145 | Phthalocyanine skeleton compound A | 0.20 | — | 0 |
| Example 23 | Compound A having heterocyclic structure formed of benzimidazole skeleton and coumarin skeleton | 0.70 | Xanthene skeleton compound A | 0.10 | 620 | 50 | Azo skeleton compound A | 0.20 | — | 0 |
| Example 24 | Compound A having heterocyclic structure formed of benzimidazole skeleton and coumarin skeleton | 0.70 | Xanthene skeleton compound A | 0.10 | 620 | 50 | Azo skeleton compound A | 0.30 | — | 0 |
| Example 25 | Compound A having heterocyclic structure formed of benzimidazole skeleton and coumarin skeleton | 0.70 | Xanthene skeleton compound A | 0.10 | 620 | 50 | Azo skeleton compound B | 0.30 | — | 0 |
| Example 26 | Compound A having heterocyclic structure formed of benzimidazole skeleton and coumarin skeleton | 0.70 | Xanthene skeleton compound A | 0.10 | 620 | 50 | Azo skeleton compound B | 0.30 | — | 0 |
| Example 27 | Compound A having heterocyclic structure formed of benzimidazole skeleton and coumarin skeleton | 0.70 | Xanthene skeleton compound A | 0.10 | 620 | 50 | Naphthamide skeleton compound A | 0.30 | — | 0 |
| Example 28 | Compound A having heterocyclic structure formed of benzimidazole skeleton and coumarin skeleton | 0.70 | Xanthene skeleton compound A | 0.10 | 620 | 50 | Naphthamide skeleton compound A | 0.20 | — | 0 |
| Example 29 | Triarylmethane skeleton compound A | 1.30 | — | 0 | 450 | 240 | Phthalocyanine skeleton compound A | 0.20 | — | 0 |
| Example 30 | Triarylmethane skeleton compound A | 1.30 | — | 0 | 450 | 240 | Phthalocyanine skeleton compound A | 0.40 | — | 0 |
| Example 31 | Xanthene skeleton compound A | 1.00 | — | 0 | 630 | 40 | Quinacridone skeleton compound B | 0.40 | — | 0 |
| Example 32 | Xanthene skeleton compound A | 1.00 | — | 0 | 630 | 40 | Quinacridone skeleton compound B | 0.40 | — | 0 |
| Example 33 | Xanthene skeleton compound A | 1.00 | — | 0 | 630 | 40 | Naphthamide skeleton compound A | 0.40 | — | 0 |
| Example 34 | Xanthene skeleton compound A | 1.00 | — | 0 | 630 | 40 | Naphthamide skeleton compound A | 0.40 | — | 0 |
| Example 35 | Xanthene skeleton compound A | 1.00 | — | 0 | 630 | 40 | Quinacridone skeleton compound B | 0.40 | — | 0 |
| Example 36 | Xanthene skeleton compound A | 1.00 | — | 0 | 630 | 40 | Quinacridone skeleton compound B | 0.40 | — | 0 |

TABLE 2-continued

| | Type of binder resin | Method for producing resin particle | Hue angle of resin particle (°) | Difference in hue angle (°) | Sum of spectral reflectances of fluorescent colorants (%) | Integrated value of spectral reflectance of color pigment in wavelength A ± 30 nm | Fluorescence intensity of resin particle (%) | Target color | ΔE between image and target color |
|---|---|---|---|---|---|---|---|---|---|
| Example 19 | Amorphous polyester resin | Aggregation-coalescence method | 135 | 10 | 115 | 3,300 | 105 | DIC591 | 7 |
| Example 20 | Amorphous polyester resin | Kneading-pulverization method | 135 | 10 | 115 | 3,300 | 105 | DIC591 | 8 |
| Example 21 | Amorphous polyester resin | Aggregation-coalescence method | 135 | 10 | 115 | 3,300 | 105 | PANTONE802C | 10 |
| Example 22 | Amorphous polyester resin | Kneading-pulverization method | 135 | 10 | 115 | 3,300 | 105 | PANTONE802C | 10 |
| Example 23 | Amorphous polyester resin | Aggregation-coalescence method | 55 | 355 | 155 | 3,300 | 114 | PANTONE804C | 10 |
| Example 24 | Amorphous polyester resin | Kneading-pulverization method | 55 | 355 | 155 | 3,300 | 113 | PANTONE804C | 10 |
| Example 25 | Amorphous polyester resin | Aggregation-coalescence method | 40 | 10 | 155 | 3,200 | 109 | DIC587 | 9 |
| Example 26 | Amorphous polyester resin | Kneading-pulverization method | 40 | 10 | 155 | 3,200 | 108 | DIC587 | 10 |
| Example 27 | Amorphous polyester resin | Aggregation-coalescence method | 55 | 355 | 155 | 2,900 | 109 | DIC588 | 8 |
| Example 28 | Amorphous polyester resin | Kneading-pulverization method | 55 | 355 | 155 | 2,900 | 108 | DIC588 | 10 |
| Example 29 | Amorphous polyester resin | Aggregation-coalescence method | 230 | 10 | 112 | 3,300 | 104 | PANTONE801C | 10 |
| Example 30 | Amorphous polyester resin | Kneading-pulverization method | 230 | 10 | 112 | 3,300 | 104 | PANTONE801C | 10 |
| Example 31 | Amorphous polyester resin | Aggregation-coalescence method | 30 | 10 | 150 | 2,900 | 113 | PANTONE805C | 10 |
| Example 32 | Amorphous polyester resin | Kneading-pulverization method | 30 | 10 | 150 | 2,900 | 112 | PANTONE805C | 10 |
| Example 33 | Amorphous polyester resin | Aggregation-coalescence method | 8 | 32 | 150 | 2,900 | 109 | DIC585 | 9 |
| Example 34 | Amorphous polyester resin | Kneading-pulverization method | 8 | 32 | 150 | 2,900 | 108 | DIC585 | 9 |
| Example 35 | Amorphous polyester resin | Aggregation-coalescence method | 15 | 25 | 150 | 2,900 | 108 | DIC586 | 9 |
| Example 36 | Amorphous polyester resin | Kneading-pulverization method | 16 | 24 | 150 | 2,900 | 108 | DIC586 | 9 |

TABLE 3

| | Fluorescent colorant 1 | | Fluorescent colorant 2 | | Fluorescence peak wavelength of fluorescent colorant (nm) | Hue angle of fluorescent colorant (°) | Color pigment 1 | | Color pigment 2 | |
|---|---|---|---|---|---|---|---|---|---|---|
| | Type | Content in resin particle (mass %) | Type | Content in resin particle (mass %) | | | Type | Content in resin particle (mass %) | Type | Content in resin particle (mass %) |
| Example 37 | Xanthene skeleton compound B | 1.00 | — | 0 | 650 | 330 | Quinacridone skeleton compound B | 0.30 | — | 0 |
| Example 38 | Xanthene skeleton compound B | 1.00 | — | 0 | 650 | 330 | Quinacridone skeleton compound B | 0.30 | — | 0 |
| Example 39 | Xanthene skeleton compound A | 1.00 | — | 0 | 560 | 8 | Quinacridone skeleton compound A | 0.90 | — | 0 |
| Com. Ex. 1 | Xanthene skeleton compound A | 1.00 | — | 0 | 560 | 8 | Naphthamide skeleton compound A | 0.20 | — | — |
| Com. Ex. 2 | Xanthene skeleton compound A | 1.00 | — | 0 | 560 | 8 | Naphthamide skeleton compound A | 0.20 | — | — |
| Com. Ex. 3 | Xanthene skeleton compound A | 1.00 | — | 0 | 560 | 8 | Quinacridone skeleton compound A | 1.55 | — | — |
| Com. Ex. 4 | Xanthene skeleton compound A | 1.00 | — | 0 | 560 | 8 | Quinacridone skeleton compound A | 1.55 | — | — |
| Com. Ex. 5 | Xanthene skeleton compound A | 1.00 | — | 0 | 560 | 8 | — | — | — | — |
| Com. Ex. 6 | Xanthene skeleton compound A | 1.00 | — | 0 | 560 | 8 | — | — | — | — |

| | Type of binder resin | Method for producing resin particle | Hue angle of resin particle (°) | Difference in hue angle (°) | Sum of spectral reflectances of fluorescent colorants (%) | Integrated value of spectral reflectance of color pigment in wavelength A ± 30 nm | Fluorescence intensity of resin particle (%) | Target color | ΔE between image and target color |
|---|---|---|---|---|---|---|---|---|---|
| Example 37 | Amorphous polyester resin | Aggregation-coalescence method | 340 | 350 | 145 | 3,200 | 108 | PANTONE807C | 10 |
| Example 38 | Amorphous polyester resin | Kneading-pulverization method | 340 | 350 | 145 | 3,200 | 108 | PANTONE807C | 10 |
| Example 39 | Styrene-acrylic resin | St/Ac-EA method | 345 | 23 | 150 | 2,600 | 107 | DIC584B | 10 |
| Com. Ex. 1 | Amorphous polyester resin | Aggregation-coalescence method | 346 | 22 | 155 | 2,300 | 80 | DIC584B | 10 |
| Com. Ex. 2 | Amorphous polyester resin | Kneading-pulverization method | 346 | 22 | 155 | 2,300 | 77 | DIC584B | 10 |
| Com. Ex. 3 | Amorphous polyester resin | Aggregation-coalescence method | 344 | 24 | 155 | 2,200 | 100 | DIC584B | 10 |
| Com. Ex. 4 | Amorphous polyester resin | Kneading-pulverization method | 344 | 24 | 155 | 2,200 | 99 | DIC584B | 10 |
| Com. Ex. 5 | Amorphous polyester resin | Kneading-pulverization method | 355 | 13 | 150 | — | 99 | DIC584B | 17 |
| Com. Ex. 6 | Amorphous polyester resin | Kneading-pulverization method | 355 | 13 | 150 | — | 99 | DIC584B | 17 |

Com. Ex.: Comparative Example

In Tables 1 to 3, the "difference in hue angle" represents the difference between the hue angle of the resin particle (toner for electrostatic image development) and the hue angle of the fluorescent colorant.

The details of fluorescent colorants and color pigments in Tables 1 to 3 other than those described above are as follows.

Xanthene skeleton compound A: Basic Red 1
Quinacridone skeleton compound A: C.I. Pigment Violet 19
Xanthene skeleton compound B: Basic Violet 11:1
Quinacridone skeleton compound B: C.I. Pigment Red 122
Azo skeleton compound A: C.I. Pigment Yellow 74
Compound A having heterocyclic structure formed of benzimidazole skeleton and coumarin skeleton: Basic Yellow 40
Benzimidazolone skeleton compound A: C.I. Pigment Yellow 180
Triarylmethane skeleton compound A: Basic Blue 7
Phthalocyanine skeleton compound A: C.I. Pigment Blue 15:3
Azo skeleton compound B: C.I. Pigment Yellow 174
Naphthamide skeleton compound A: C.I. Pigment Orange 38

The results in Tables 1 to 3 show that the resin particles (toners for electrostatic image development) of Examples provide images having fluorescence intensities higher than those of images obtained by using the resin particles (toners for electrostatic image development) of Comparative Examples.

Furthermore, the results in Tables 1 to 3 show that the resin particles (toners for electrostatic image development) of Examples have colors close to the target colors and exhibit high color reproducibility.

Example 40

Production of Coated Product

The resin particles of Example 1 are applied to a rectangular test panel formed of a zinc phosphate-treated steel sheet having a size of 10 cm×10 cm by using a corona gun manufactured by ASAHI SUNAC CORPORATION. Specifically, the resin particles are applied to the test panel at a distance 30 cm away from the front surface by sliding the corona gun in the horizontal and vertical directions so as to form a coating film having a thickness of 30 μm or more and 50 μm or less. The resulting test panel is then baked at 150° C. for 5 minutes to produce a coated product.

It is confirmed that, in the coated product produced as described above, the powder adheres to the product to be coated (zinc phosphate-treated steel sheet) and thus coating is performed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A resin particle comprising:
    a resin;
    a fluorescent colorant; and
    a color pigment, wherein
    a hue angle of the resin particle and a hue angle of the fluorescent colorant are different from each other, and
    when a fluorescence peak wavelength in a spectral reflectance of the fluorescent colorant is represented by A (nm), an integrated value of a spectral reflectance (%) of the color pigment in a wavelength range of from A−30 (nm) to A+30 (nm) is 2,500 or more,
    wherein a content of the color pigment is 0.05% by mass or more and 1.5% by mass or less based on the total mass of the resin particle,
    wherein a content of the fluorescent colorant is 0.1% by mass or more and 3.5% by mass or less based on a total mass of the resin particle,
    wherein the fluorescent colorant includes at least one compound having a xanthene structure, and the color pigment is a compound having a quinacridone structure, and wherein the at least one compound having a xanthene structure is a compound having a rhodamine structure, a fluorescein structure, or an eosin structure.

2. The resin particle according to claim 1, wherein a difference between the hue angle of the resin particle and the hue angle of the fluorescent colorant is 1 (°) or more.

3. The resin particle according to claim 1, wherein
    the fluorescent colorant includes at least one compound having a heterocyclic structure formed of a benzimidazole skeleton and a coumarin skeleton, and
    the color pigment is a compound having an azo structure or a compound having a benzimidazolone structure.

* * * * *